United States Patent
Ketchpaw et al.

(10) Patent No.: US 10,699,291 B2
(45) Date of Patent: Jun. 30, 2020

(54) USER CONSUMPTION OF THIRD-PARTY OFFER CONTENT THROUGH A SOCIAL NETWORKING SYSTEM

(71) Applicant: Facebook, Inc., Menlo Park, CA (US)

(72) Inventors: John Stephen Ketchpaw, Seattle, WA (US); Dan Barak, Redwood City, CA (US); Kenji Droullard, Seattle, WA (US); James F. Geist, Jr., Issaquah, WA (US); Hiral Mehta, Seattle, WA (US); Florian Raphael David Laplantif, Seattle, WA (US); Dean Jackson, Seattle, WA (US)

(73) Assignee: FACEBOOK, INC., Menlo Park, CA (US)

(*) Notice: Subject to any disclaimer, the term of this patent is extended or adjusted under 35 U.S.C. 154(b) by 464 days.

(21) Appl. No.: 15/360,640

(22) Filed: Nov. 23, 2016

(65) Prior Publication Data

US 2018/0144362 A1    May 24, 2018

(51) Int. Cl.
| | | |
|---|---|---|
| *G06Q 30/00* | (2012.01) | |
| *G06Q 30/02* | (2012.01) | |
| *H04L 29/08* | (2006.01) | |
| *G06Q 50/00* | (2012.01) | |

(52) U.S. Cl.
CPC ..... *G06Q 30/0239* (2013.01); *G06Q 30/0222* (2013.01); *H04L 67/20* (2013.01); *G06Q 50/01* (2013.01)

(58) Field of Classification Search
CPC ............ G06Q 30/0239; G06Q 50/01; G06Q 30/0222; H04L 67/20
USPC ................. 705/14.1, 14.23, 14.39
See application file for complete search history.

(56) References Cited

U.S. PATENT DOCUMENTS

| | | | | |
|---|---|---|---|---|
| 5,789,732 A | * | 8/1998 | McMahon | G06K 19/07703 235/380 |
| 6,922,843 B1 | * | 7/2005 | Herrington | H04N 7/163 348/E7.061 |
| 7,975,019 B1 | * | 7/2011 | Green | G06Q 30/0241 709/217 |
| 9,875,497 B1 | * | 1/2018 | Kotas | G06Q 30/0625 |
| 2002/0029252 A1 | * | 3/2002 | Segan | G06Q 30/02 709/217 |
| 2003/0076341 A1 | * | 4/2003 | Kuki | G06F 3/04817 715/700 |

(Continued)

OTHER PUBLICATIONS

Javkar, et al., "Best Offer Recommendation Service." 2016 ICACCI, Sep. 21-24, 2016, Japar, India. (Year: 2016).*

*Primary Examiner* — Luis A Brown
(74) *Attorney, Agent, or Firm* — Keller Jolley Preece

(57) ABSTRACT

The present disclosure is directed toward systems and methods for providing third-party content to users of a social networking system. For example, the disclosed systems and methods receive content associated with an offer from a third party for presentation to a user, display the content associated with the offer in a graphical user interface including a feed of social networking content associated with the user, and detecting an interaction of the user with the displayed content associated with the offer. In response to the interaction of the user, the systems and methods navigate to a website associated with the third party and display a graphical element associated with the offer overlaying a portion of the website.

20 Claims, 13 Drawing Sheets

(56) References Cited

U.S. PATENT DOCUMENTS

| | | | |
|---|---|---|---|
| 2004/0003406 A1* | 1/2004 | Billmaier | G06F 1/3203 725/60 |
| 2004/0162778 A1* | 8/2004 | Kramer | G06Q 20/10 705/40 |
| 2005/0166256 A1* | 7/2005 | Blackketter | H04N 21/4383 725/135 |
| 2005/0197893 A1* | 9/2005 | Landau | G06Q 30/02 705/14.13 |
| 2007/0107010 A1* | 5/2007 | Jolna | H04N 21/812 725/34 |
| 2008/0022300 A1* | 1/2008 | Angiolillo | H04N 7/17318 725/32 |
| 2008/0319852 A1* | 12/2008 | Gardner | G06Q 30/02 705/14.4 |
| 2009/0076912 A1* | 3/2009 | Rajan | G06Q 30/02 705/14.64 |
| 2012/0239529 A1* | 9/2012 | Low | G06Q 20/02 705/26.41 |
| 2012/0290977 A1* | 11/2012 | Devecka | H04W 4/21 715/810 |
| 2013/0080235 A1* | 3/2013 | Wolfe | G06Q 30/0207 705/14.26 |
| 2013/0185150 A1* | 7/2013 | Crum | G06Q 30/02 705/14.49 |
| 2013/0311279 A1* | 11/2013 | Bui | G06Q 30/00 705/14.51 |
| 2014/0080560 A1* | 3/2014 | Knutsson | G07F 17/32 463/10 |
| 2014/0114755 A1* | 4/2014 | Mezzacca | G06Q 30/02 705/14.51 |
| 2015/0195095 A1* | 7/2015 | Gillead | H04L 51/32 726/7 |
| 2015/0213542 A1* | 7/2015 | Wallaja | G06Q 30/0635 705/14.55 |
| 2015/0242878 A1* | 8/2015 | Cook | G06Q 30/0222 705/14.23 |
| 2015/0324850 A1* | 11/2015 | Rivera | G06Q 30/0267 705/14.58 |
| 2016/0055518 A1* | 2/2016 | Ahn | G06Q 30/0207 705/14.39 |
| 2016/0098701 A1* | 4/2016 | Harris | G06Q 30/0273 705/14.64 |
| 2016/0239624 A1* | 8/2016 | Short | A61B 5/02055 |
| 2017/0116666 A1* | 4/2017 | Lawson | H04W 4/21 |
| 2018/0048696 A1* | 2/2018 | Cheng | H04L 51/32 |
| 2018/0089712 A1* | 3/2018 | Watanabe | G06Q 30/0201 |

\* cited by examiner

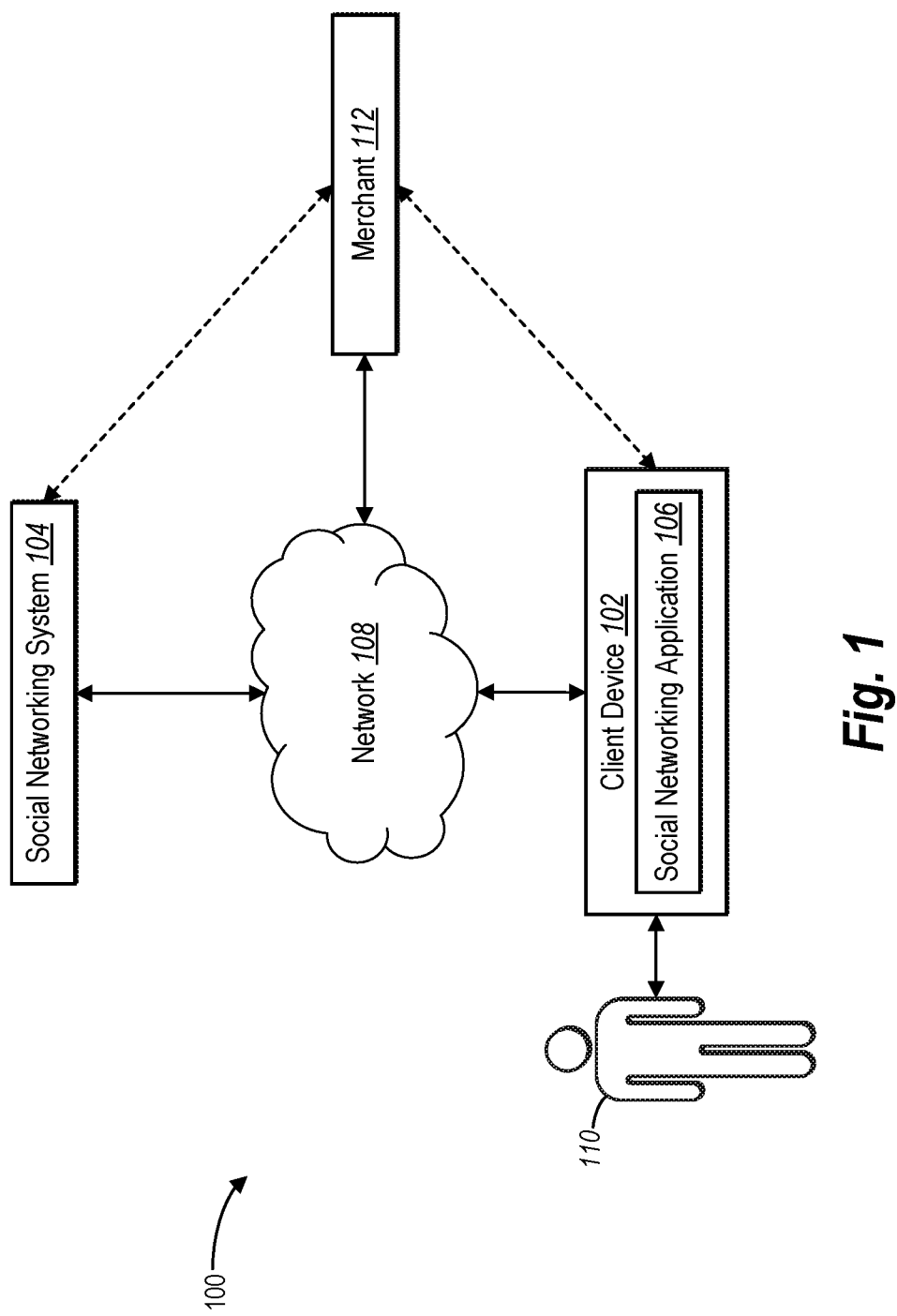

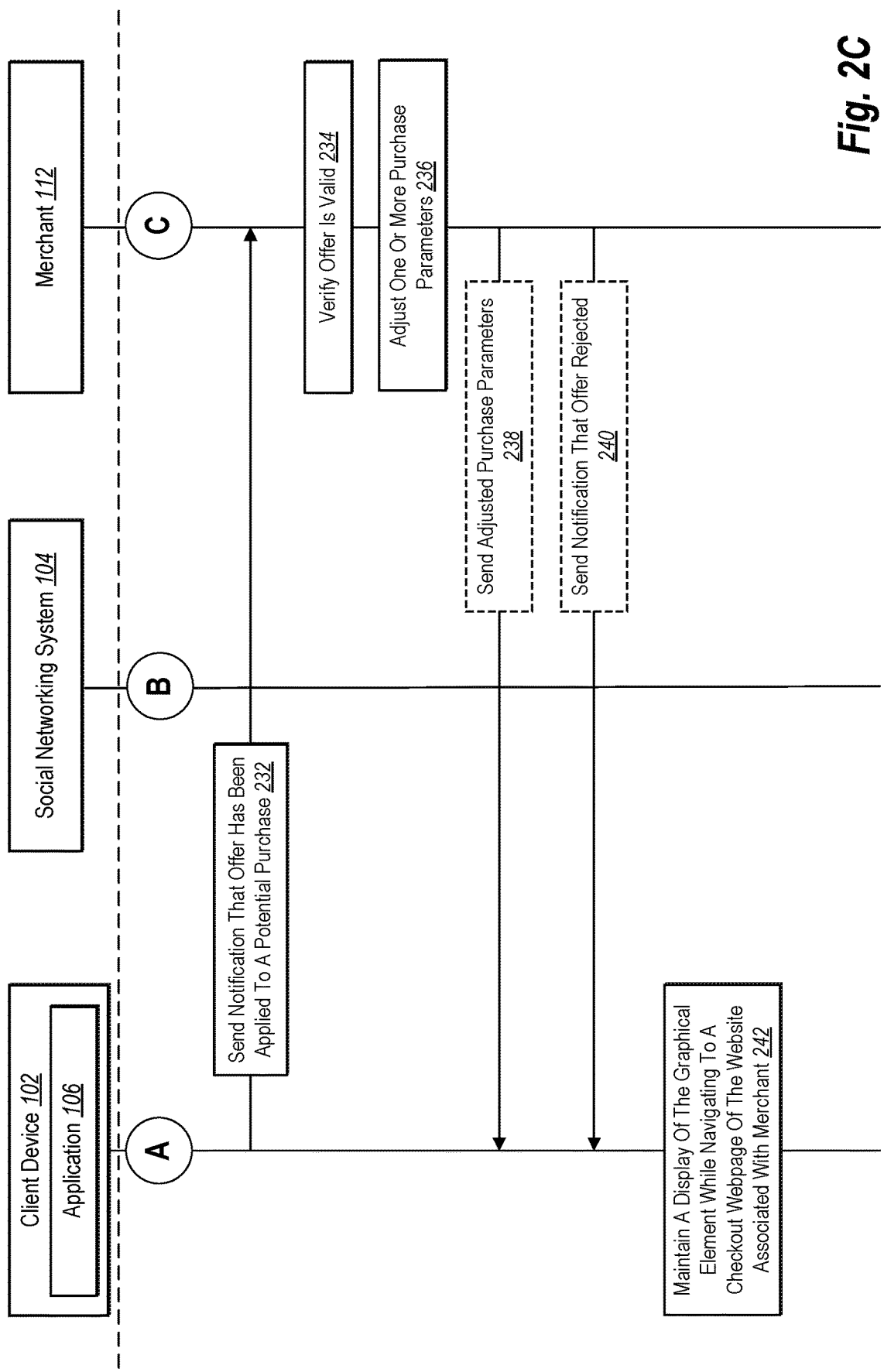

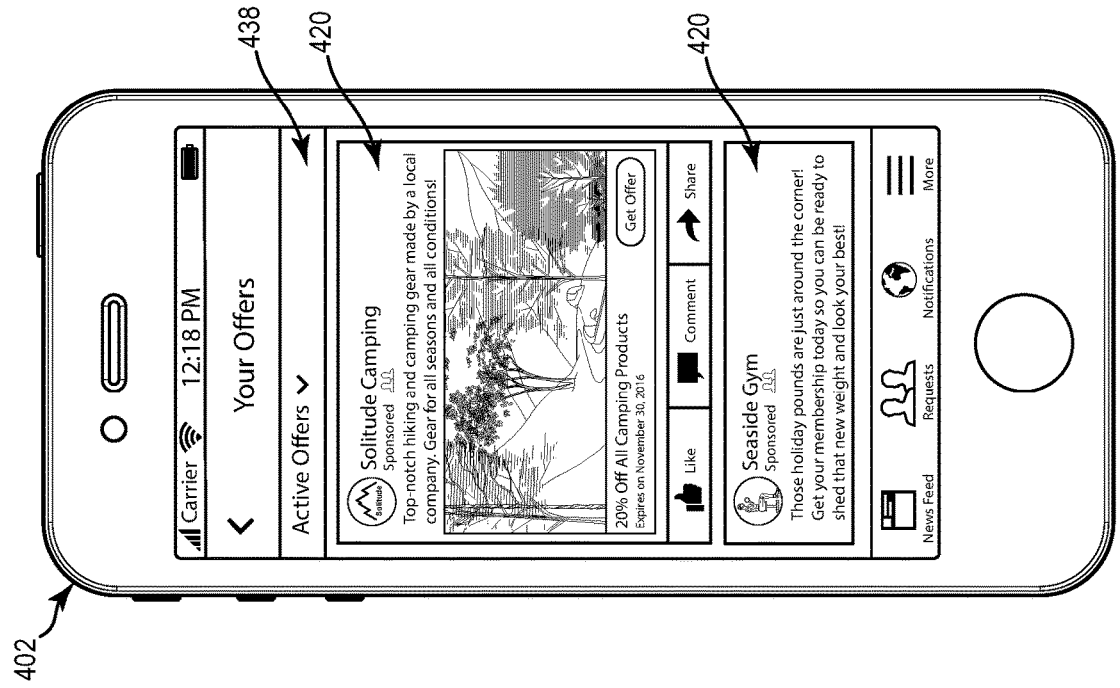
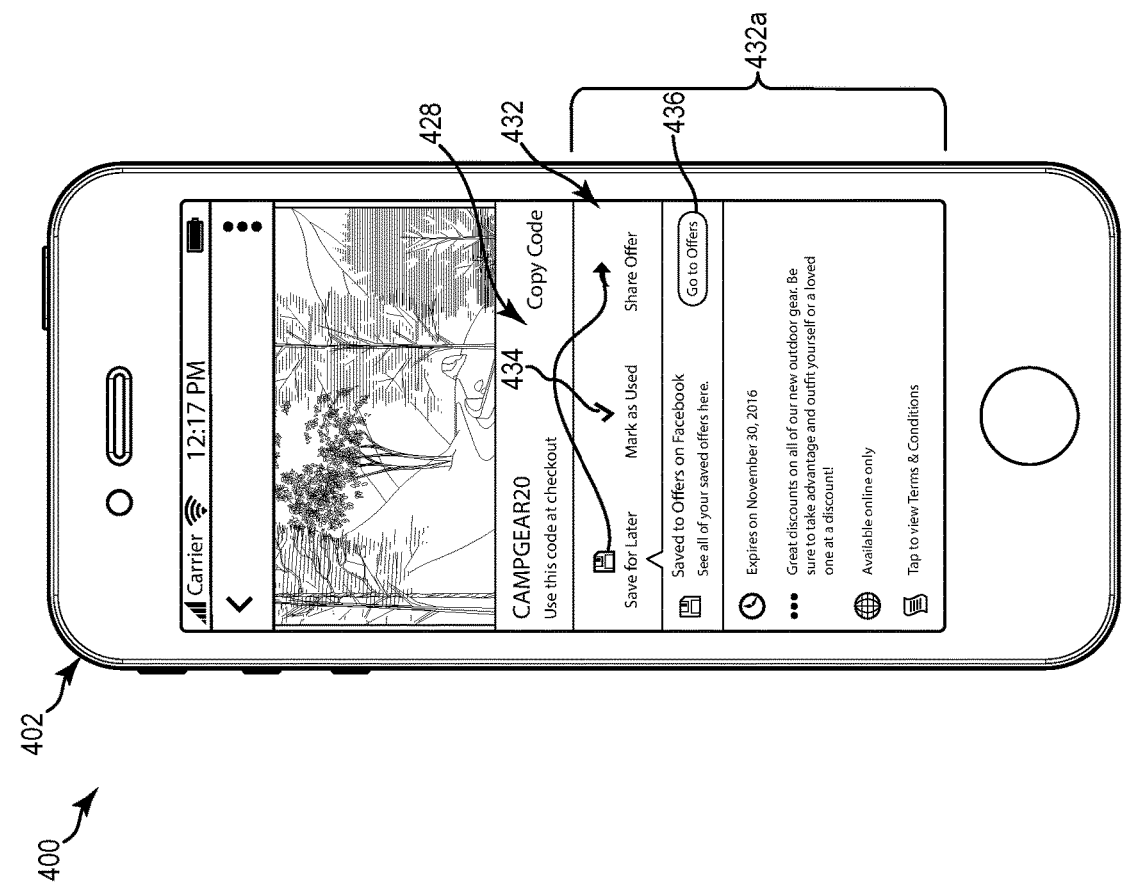
Fig. 4D
Fig. 4C

USER CONSUMPTION OF THIRD-PARTY OFFER CONTENT THROUGH A SOCIAL NETWORKING SYSTEM

BACKGROUND

While shopping in physical "brick-and-mortar" stores is common, purchasing goods from online merchants continues to increase in popularity. Online shoppers generally find it very convenient to browse an online merchant's catalog from the ease and comfort of their own homes. Furthermore, online shoppers typically need only wait a day or two to receive the goods they purchased online. Online shoppers generally view this short wait time as minimally inconvenient in comparison with the convenience of not having to leave their homes in order to buy the things they want.

Due to the increasing popularity of online shopping, merchants are continually trying to find ways to attract customers to their own websites instead of competing websites. One way merchants try to attract customers to their websites and products is through promotional offers (e.g., coupon codes) that, if entered during checkout in the merchant's website, give the customers a deal (e.g., reduction price, free shipping, free items, etc.)

In some instances, the merchants provide the promotional offers directly to potential customers via emails and/or messages. In additional instances, third-party websites often gather promotional offers for merchants and provide the promotional offers to potential customers via their websites and/or applications. However, using the promotional offers typically requires navigating to and obtaining information from multiple web pages. Furthermore, when using mobile devices, using promotional offers often requires opening and using multiple applications concurrently to allow the user to apply the promo code at the merchant's website. Having multiple web pages and/or applications open concurrently on a mobile device and flipping back and forth between the web pages and/or applications can be cumbersome and ineffective. Furthermore, having multiple websites and/or multiple applications open concurrently requires increased processing capabilities, power (e.g., battery power), and memory from a computing device (e.g., a mobile device, laptop computer, desktop computer, etc.). This becomes of particular concern with mobiles devices, which, in some cases, have relatively limited processing capabilities, power, and memory.

Thus, there are several disadvantages to current methods for merchants providing promotional offers (e.g., coupon codes) to potential customers and those potential customers using the promotional offers.

SUMMARY

One or more embodiments described herein provide benefits and/or solve one or more of the foregoing or other problems in the art with systems and methods for providing promotional content (e.g., coupon codes) from third parties (e.g., merchants) to users of a social networking system. Particularly, some embodiments of the present disclosure include systems and methods for displaying and maintaining a display of a promotional offer (e.g., a coupon code, discounts) to a user of a social networking application while the user is web browsing and/or application browsing. Thus, because the systems and methods maintain a display of the promotional offer while the user is web browsing and/or application browsing, the systems and methods keep the promotional offer readily available for the user to use in a purchase.

Additional embodiments of the present disclosure include systems and methods for generating and displaying the promotional offers overlaying websites and applications. In other words, the promotional offers are displayed over at least a portion of the websites and application. Therefore, because the systems and methods display the promotional offer overlaying websites and applications, the systems and methods require fewer websites and/or applications to be concurrently open (e.g., running) in order to view and use the promotional offer. As a result, the systems and methods of the present disclosure use less processing capabilities, power (e.g., battery power), and memory of a client device in comparison to conventional systems and methods.

Further embodiments of the present disclosure include systems and methods for providing an active offers page within a social networking application whereby a user can save and/or readily access current promotional offers (e.g., coupon codes) presented to the user. Accordingly, because the user can save offers and readily access promotional offers, the systems and methods assist a user in not losing and/or forgetting the promotional offers. As result, the systems and methods of the present disclosure encourage and facilitate use of the promotional offers leading to additional sales and revenue for merchants.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments of the invention will be described and explained with additional specificity and detail through the use of the accompanying drawings in which:

FIG. 1 illustrates a schematic diagram of an environment for implementing a communication system according to one or more embodiments of the present disclosure;

FIGS. 2A-2C illustrate a sequence-flow diagram showing interactions in a communication process between a user and a merchant via a social networking system according to one or more embodiments of the present disclosure;

FIGS. 4A-4E illustrate user interfaces including features of the communication system in accordance with one or more embodiments;

DETAILED DESCRIPTION

Figure 2A:
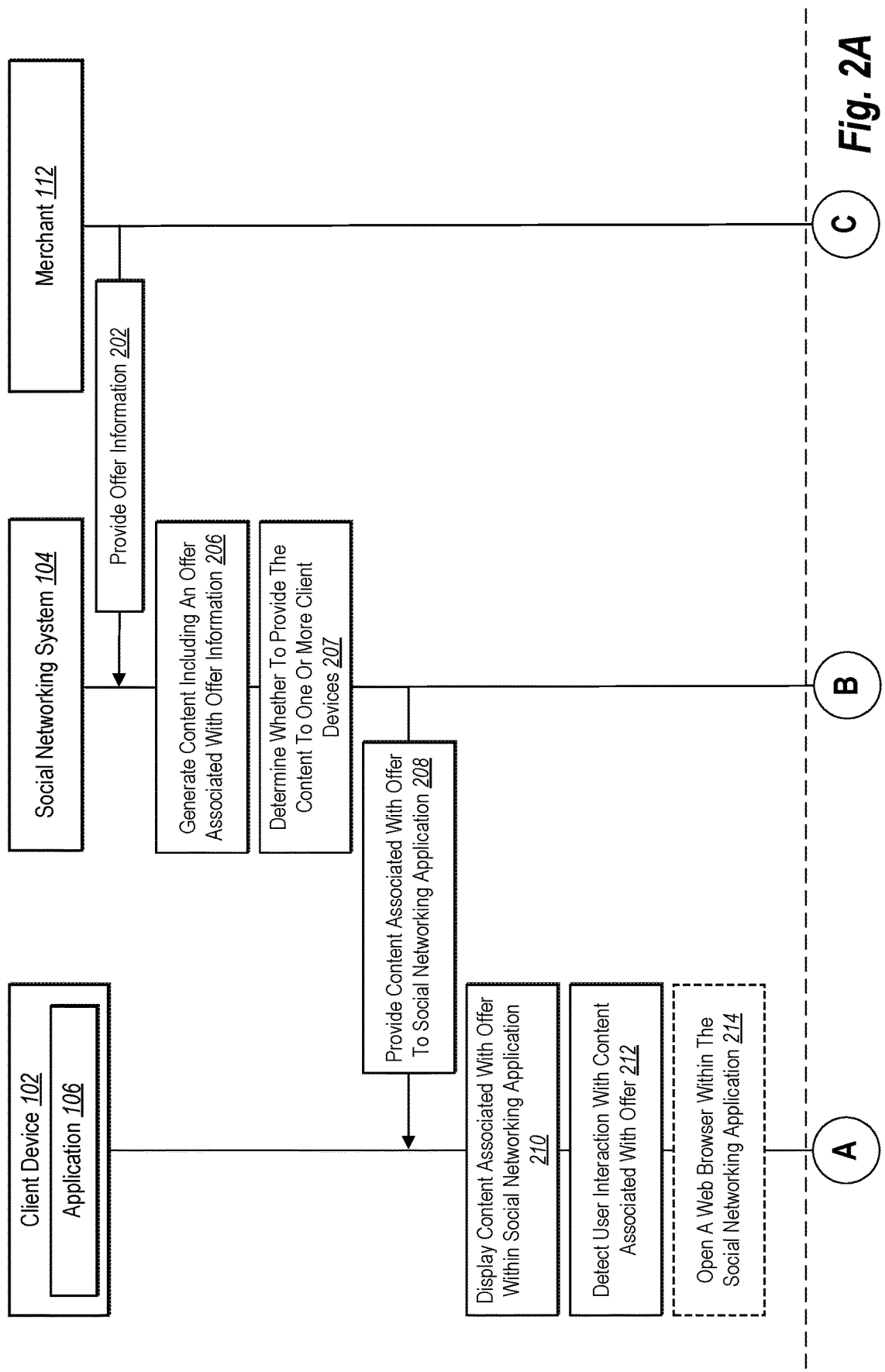

Embodiments of the present disclosure include a social networking system and a social networking application for providing promotional offers (e.g., coupon codes) to potential customers and assisting those potential customers in using the promotional offers. For example, in some embodiments of the present disclosure, the social networking application generates and maintains a display of a graphical element showing a promotional offer. In additional embodiments, the social networking application displays the graphical element overlaying websites and/or applications. In yet further embodiments, the social networking application provides an active offers page within the social networking application whereby a user can save promotional offers and can readily access promotional offers already offered to the user.

As noted above, the social networking application generates and maintains a display of a graphical element showing a promotional offer. For example, a merchant provides an offer to the social networking system, and the social networking system generates content indicating the offer (e.g., a social media object indicating the offer). Furthermore, the social networking system provides the content to a social media application of a client device. The social media application may display the content to a user of the client device, and upon a user interaction with the content (e.g., receiving indication that the user wants to potentially accept the offer), the social media application generates and displays a graphical element (e.g., an offer object) including elements of the offer necessary to redeem the offer (e.g., a coupon code). Moreover, as the user navigates through websites and/or applications, the social media applications maintains a display of the graphical element such that the any elements of the offer necessary to redeem the offer are continuously available to the user while the user accepts the offer (e.g., purchases a product associated with the offer on the merchant's website).

Because the social networking application generates and displays the graphical element, the social networking system and application of the present disclosure provide advantages over conventional offer systems by removing any need to flip back and forth between websites and/or applications while trying to redeem an offer. Furthermore, because the social networking application maintains a display of the graphical element while a user navigates through websites and/or applications, the social networking system and application of the present disclosure reduce a likelihood that the user will forget and/or lose the elements necessary to redeem the offer. Thus, the networking system and application may result in an increased number of redeemed offers, and as a result, increased sales and revenue for a merchant in comparison to conventional offer systems.

As mentioned briefly above, in addition to generating and displaying the graphical element while a user navigates through websites and/or applications, the social media application displays the graphical element to overlay portions of the websites and/or other applications. In other words, the social networking application displays the graphical element such that the graphical element covers (e.g., is displayed over top of) at least a portion of the merchant's web site.

Because the social networking application displays the graphical element by merely overlaying the websites and/or other applications, the social networking system and application provide advantages over conventional offer systems by removing any need to have multiple websites and/or applications concurrently running to copy and/or re-type any elements of the offer into a website associated with the merchant and/or application. Furthermore, because the social networking system and social networking application of the present disclosure remove any need to have multiple websites and/or applications concurrently running, the social networking system and social networking application of the present disclosure reduces required processing capabilities, power (e.g., battery power), and memory from a client device.

An "offer," as used herein, is a promotion presented by the merchant to one or more users of a social networking application of the social networking system. In other words, in some embodiments, the offer may be an available discount on the merchant's merchandise. In additional embodiments, the offer must be "accepted" in order for a user to obtain the discounts. In some instances, a user may "accept" the offer by using a coupon (e.g., promo) code when purchasing the merchandize.

FIG. 1 illustrates a schematic diagram of a communication system 100 according to one or more embodiments of the present disclosure. As shown in FIG. 1, the communication system 100 may include various components for performing the processes and features described herein. For example, the communication system 100 includes at least one client device 102 and a social networking system 104, which are communicatively coupled through a network 108. As used herein, the term "social networking system" refers to a system that supports and enables on-line communication, input, interaction, content-sharing, and collaboration between users. Also as illustrated in FIG. 1, a user 110 interacts with the client device 102 in order to access content and/or services on or provided by the social networking system 104. In one or more embodiments, the communication system 100 may also include a merchant 112 (e.g., a merchant server accessed via the network, and communicatively linked to the social networking system 104). A "merchant," as used herein, is an entity such as a service provider who provides goods and/or services to customers. In one or more embodiments, the merchant 112 can provide goods or services for purchase over the Internet via one or more websites. In some embodiments, a merchant 112 may have physical retail locations in addition to one or more websites In some embodiments, the client device 102 may include a social networking application 106 associated with the social networking system 104. The social networking application 106 of the client device 102 accesses the social networking system 104 via the network 108. In one or more embodiments, the social networking application 106 can be a native application installed on the client device 102. For example, the social networking application 106 may be a mobile application that installs and runs on a mobile device, such as a smart phone or a tablet. Alternatively, the social networking application 106 can be a desktop application, widget, or other form of a native computer program. Alternatively, the social networking application 106 may be a remote application accessed by the client device 102. For example, the social networking application 106 may be a web application that is executed within a web browser of the client device 102.

The client device 102, the merchant 112, and the social networking system 104 communicate via the network 108, which may include one or more networks and may use one or more communication platforms or technologies suitable for transmitting data and/or communication signals. In one or more embodiments, the network 108 includes the Internet or World Wide Web. The network 108, however, can include various other types of networks that use various communication technologies and protocols, such as a corporate intranet, a virtual private network (VPN), a local area network (LAN), a wireless local network (WLAN), a cellular network, a wide area network (WAN), a metropolitan area network (MAN), or a combination of two or more such networks. Although FIG. 1 illustrates a particular arrangement of the client device 102, the social networking system 104, the merchant 112, and the network 108, various additional arrangements are possible. For example, the client device 102 may directly communicate with the social networking system 104 and/or the merchant 112, bypassing the network 108. Additional details relating to the network 108 are explained below with reference to FIG. 8.

As mentioned briefly above, the communication system 100 includes the user 110. Furthermore, the user 110 may be individuals (i.e., human users), businesses, groups, or other entities. Although FIG. 1 illustrates one user 110, it is understood that the communication system 100 can include a plurality of users, with each of the plurality of users interacting with the communication system 100 through a corresponding plurality of client devices 102.

The client device 102 can be any one or more of various types of computing devices. For example, the client device 102 may include a mobile device such as a mobile telephone, a smartphone, a PDA, a tablet, a laptop or a non-mobile device such as a desktop, a server, or another type of computing device. Further, the client device 102 may run dedicated social networking applications (e.g., such as the social networking application 106, as described above) associated with the social networking system 104 to access social networking content (e.g., posts, messages, profiles, etc.) associated with the communication system 100. Additional details with respect to the client device 102 are discussed below with respect to FIG. 7.

Figure 2B:
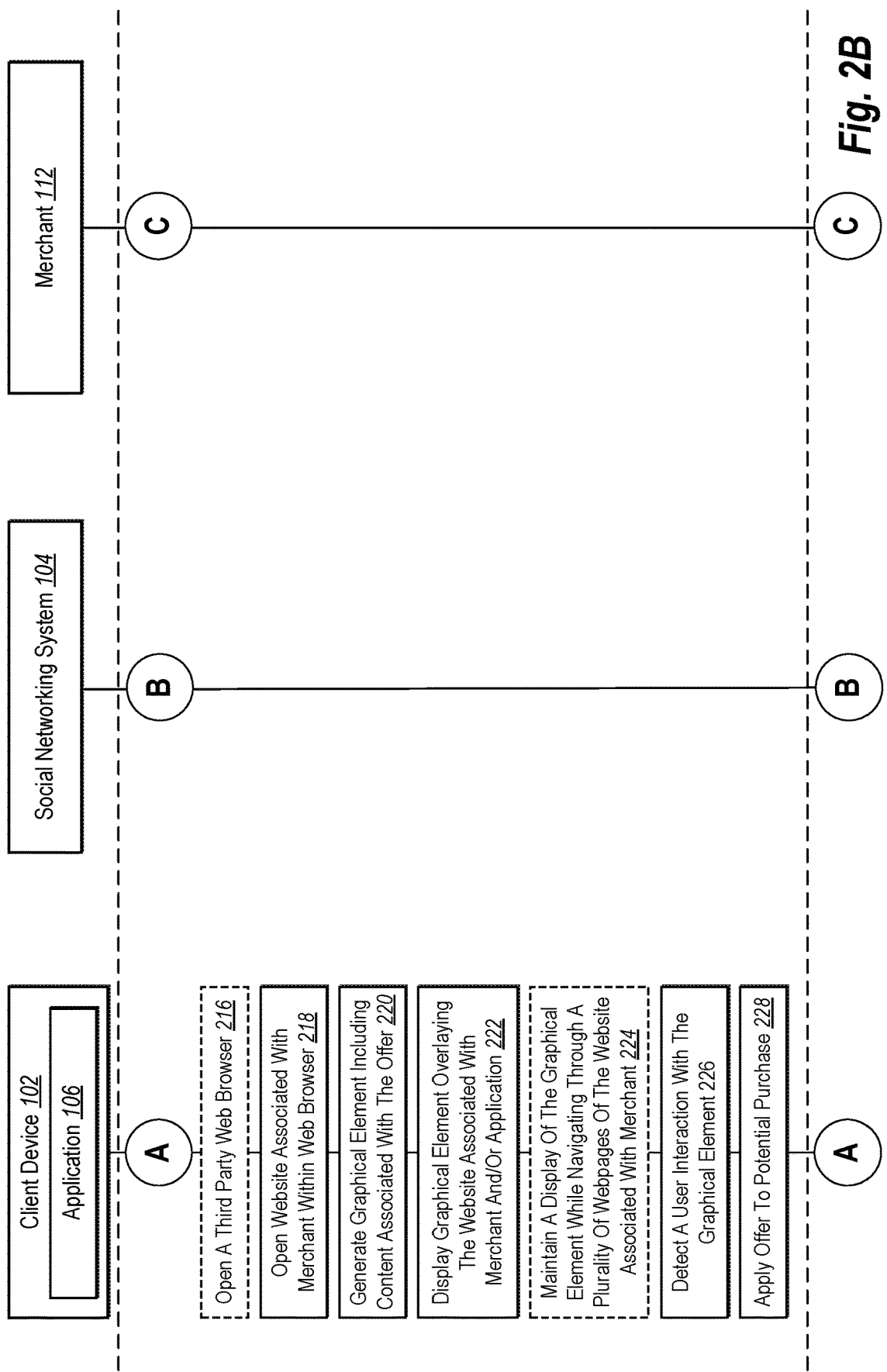

FIGS. 2A-2C illustrate a sequence-flow diagram 200 showing various example steps for providing promotional content to user 110. The client device 102, the social networking system 104, and the merchant 112 shown in FIGS. 2A-2C may be example embodiments of the client device 102, the social networking system 104, and the merchant 112 described in regard to FIG. 1.

As shown in FIG. 2A, the merchant 112 provides the social networking system 104 with offer information related to an offer from the merchant 112, as shown in step 202. The offer information may include parameters of the offer. For example, the offer information may include offer guidelines, which may include one or more timelines of when the offer begins and when the offer expires, a number of available offers (e.g., a limit on how many offers can be redeemed), required elements for redeeming the offer (e.g., tokens, discount codes, coupon codes, and/or gift card information), and targeted groups of potential customers. Furthermore, the offer information may include product details (e.g., details about the product associated with the offer). The product details may include product specifications, images of the product, and/or reviews about the product.

In some embodiments, the offer may include one or more of a specific monetary amount off of a purchase (e.g., $10 off) with the merchant 112, a percentage amount off of a purchase (e.g., 10% off) with the merchant 112, a buy one or more deal, or buy one or more and get a percentage off another deal with the merchant 112. Although specific examples of the offer are provided herein, the disclosure is not so limited and can include any deal known in the art.

After receiving the offer information from the merchant 112, in one or more embodiments, the social networking system 104 generates content associated with the offer information, as shown in step 206 of FIG. 2A. The content may include one or more of a post (e.g., a wall post), an event, a message, a notification, or any other suitable object for displaying within a social networking application 106, or any combination thereof. Furthermore, the content may include one or more elements that indicate (e.g., communicate) the offer. For example, the content may include one or more of text, pictures, audio files, videos, and graphics indicating (e.g., stating and/or showing) the offer (e.g., deal). Additionally, the content may include any required elements for redeeming the offer (e.g., tokens and/or coupon codes). Moreover, the content may include at least one selectable element to allow users (e.g., users of the client device 102) to interact with the content. For example, the content may include a first plurality of selectable elements. The first plurality of selectable elements may include one or more text objects, buttons, hyperlinks, icons, etc. As a non-limiting example, the first plurality of selectable elements may include a "Get Offer" button.

In addition to generating the content associated with the offer information and indicating the offer, the social networking system 104 determines one or more client devices (e.g., social networking application user accounts) to provide with the content, as shown in step 207 of FIG. 2A. In other words, the social networking system 104 determines which users of the social networking system 104 and respective client devices to provide with the offer.

In one or more embodiments, the social networking system 104 determines which users to provide with the content based on the offer information provided to the social networking system 104 by the merchant 112. For example, the social networking system 104 can determine which users 110 to provide with the content based on how many offers are available and/or if the user 110 is within a targeted group of users 110. Both of the foregoing examples will be discussed in greater detail below.

If the offer information indicates a limited number of offers, the social networking system 104 can communicate and verify with the merchant 112 that offers are still available prior to providing the content to a client device 102. In some embodiments, the offer information may indicate that the social networking system 104 can provide a certain number of offers, and the social networking system 104 may track how many offers are provided to client devices 102 and may only provide the certain number of offers to users 110. For example, with the social networking system 104 and/or the merchant 112 may assign each potential offer a unique offer identification number ("ID No."). Upon determining to provide an offer to a user, the social networking system 104 may store data within an offer database of the social networking system 104 indicating that the unique offer has been issued (e.g., the social networking system 104 may check off that unique offer). Furthermore, when all of the unique offers have been issued, the social networking system 104 may determine to stop providing offers to users.

Moreover, in embodiments wherein the offer information indicates a limited number of offers are available, the offer information provided by the merchant 112 can include a plurality of unique coupon codes. Each unique coupon code may correspond to an offer of the limited number of offers. In other words, each unique coupon code may be used only once, and then the coupon code becomes invalid. In alternative embodiments, the offer information may indicate an unlimited number of offers, and the offer information may include a general coupon code that can be used an unlimited number of times.

As noted above, in addition to indicating a number of available offers and including any required elements for redeeming the offer, the offer information may specify a targeted group of users 110 of the social networking system 104. For example, the offer information may provide information for targeting users 110 of the social networking system 104. In some embodiments, the offer information includes information directing the social networking system 104 to provide the content (e.g., the offers) to users that have shown interest in a product associated and/or related to the offer.

In one or more embodiments, the social networking system 104 determines (e.g., identifies) interest from users based on activity of the user within the social networking system 104. For example, the social networking system 104 may determine interest from users based on one or more of whether the users 110 have liked and/or shared information related to the offer indicated in the content, groups (e.g., social media groups) of which users 110 are member, associations (e.g., friends) of the users 110, or postings by the users 110, etc. Furthermore, upon a determination that the user has shown interest in the product, the social networking system 104 determines to provide the content indicating the offer to the user. Accordingly, the social networking system 104 may determine to provide the content to users matching the targeted group of users 110.

In addition to determining to provide an offer to a user (e.g., a client device), the social networking system 104 can tie the offer indicated in the content to one or more of the specific client device and/or the user's social networking application account. In other words, the social networking system 104 may generate the content and/or modify the required elements (e.g., coupon codes) to require a user to use the specific client device and/or be logged into the user's social networking application account in order to redeem the offer. For example, the social networking system 104 may tie an offer indicated in the content to a serial number of the client device and/or the user's social networking application account. Particularly, as will be discussed in greater detail below in regard to step 234, upon attempting to redeem an offer the merchant 112 may verify a validity of an offer, at which time, the merchant 112 may verify that a correct client device and/or social networking account is being used to redeem the offer.

Referring still to FIG. 2A, once the social networking system 104 generates the content and determines at least one client device 102 to provide with the content, the social networking system 104 provides the content associated with and indicating the offer to the social networking application 106 of the client device 102, as shown in step 208. In one or more embodiments, the social networking system 104 provides the content to the client device 102 via the network 108.

Subsequent to receiving the content associated with the offer, the social networking application 106 and/or client device 102 displays the content within the social networking application 106, as shown in step 210 of FIG. 2A. For example, the social networking application 106 of the client device 102 can display the content within one or more of a user's newsfeed, wall, timeline, communications threads, etc. of the social networking application 106. Additionally, in some embodiments, the social networking application 106 of the client device 102 can display the content as a notification within the social networking application 106. Furthermore, the social networking application 106 of the client device 102 can display the content via a social networking application graphical user interface (e.g., GUI), as discussed in further detail in regard to FIGS. 4A-4E.

As illustrated in FIG. 2A, in addition to displaying the content, the social networking application 106 and/or the client device 102 detects a user interaction with the content, as show in step 212. For example, the social networking application 106 of the client device 102 can detect a user interaction with at least one selectable element of the content (e.g., at least one selectable element of the first plurality of selectable elements). As referred to herein, a "user interaction" refers to a single interaction (e.g., a touch gesture), or combination of interactions, received from a user by way of one or more input devices (e.g., a touch screen display of the client device 102). Furthermore, the user interaction may include one or more of clicking, tapping, or otherwise selecting the selectable element. As a non-limiting example, the social networking application 106 of the client device detects a user interaction with the "Get Offer" button discussed above.

Upon detecting the user interaction with the content, the social networking application 106 opens and displays an integrated web browser within the social networking application 106, as shown in step 214 of FIG. 2A. In other words, the social networking application 106 opens and displays a web browser specific to the social networking application 106 (e.g., a web browser that is part of the social networking application 106). Put another way, the web browser operates within the social networking application 106.

In alternative embodiments, upon detecting the user interaction with the content, the social networking application 106 and/or the client device 102 opens and displays a third party web browser, as shown in step 216 of FIG. 2B. In other words, the social networking application 106 opens and displays a web browser not associated with the social networking application 106.

In yet further embodiments, upon detecting the user interaction with the content, the social networking application 106 and/or client device 102 opens and displays another application (e.g., a merchant's application). For example, the social networking application 106 and/or the client device 102 opens and displays a shopping application associated with the merchant 112.

As shown in FIG. 2B, regardless of the web browser opened by the social networking application 106, the social networking application 106, in response to detecting the user interaction with the at least one selectable element of the content, opens the merchant's website within the web browser, as shown in step 218. In some embodiments, the social networking application 106 opens the merchant's website generally. In other words, the social networking application 106 opens a main (e.g., home) web page of the merchant's website. In alternative embodiments, the social networking application 106 opens a web page of the merchant's website associated with the offer. For example, the social networking application 106 opens a web page of the merchant's website related to a product associated with the offer.

In response to opening the merchant's website within the web browser, the social networking application 106 of the client device 102 generates a graphical element, as show in step 220, of FIG. 2B. The graphical element includes content associated with the offer. The content associated with the offer of the graphical element includes any required elements for redeeming the offer indicated in the content. For example, the graphical element includes any required tokens, coupon codes, promotional codes, and/or gift card information for redeeming the offer. Additionally, any of the above-described elements (e.g., the text of a coupon code) may be selectable and copyable within the graphical elements.

In addition to including any required elements for redeeming an offer, the content of the graphical element may include offer details. For example, the content of the graphical element may include text indicating an amount off, a percentage off, a product associated with the offer, etc. Furthermore, in some embodiments, the graphical element may include instructions on how to redeem the offer.

Beyond including required elements and offer details and/or instructions, the graphical element may include one or more selectable elements (e.g., a second plurality of selectable elements). In some embodiments, the selectable elements of the graphical element may include the required elements and/or offer details of the graphical element. In additional embodiments, the selectable elements of the graphical element may include additional icons, buttons, graphical objects, or any other inter-actable object.

Beyond generating the graphical element, the social networking application 106 of the client device 102 displays the graphical element concurrently with the merchant's website within the web browser and/or with the other application, as show in step 222 of FIG. 2B. Furthermore, the social networking application 106 displays the graphical element overlaying the merchant's website. In other words, the social networking application 106 displays the graphical element such that the graphical element covers at least a portion of the merchant's website. Put another way, the social networking application 106 displays the graphical element over at least a portion of the merchant's website. In some embodiments, the graphical element is displayed over a particular area of the merchant's website. For example, the graphical element may be displayed over a top portion, a bottom portion, a left portion, and/or a right portion of the merchant's website. However, the graphical element does not comprise a part of the website. In other words, the graphical element is separate and distinct from the merchant's website. For clarity and to facilitate discussion of the details of the systems and methods described herein, the graphical element will be described hereinafter as being displayed overlaying a website of the merchant 112. However, it is understood that the graphical element can also be displayed overlaying an application of the merchant 112. Furthermore, any of the examples described herein in regard to the graphical element overlaying a website are applicable to overlaying an application.

The graphical element can include a banner (e.g., a heading or footer overlaying the merchant's website in the form of a bar or column). In additional embodiments, the graphical element can include a ribbon or tag overlaying a portion of the merchant's website. In alternative embodiments, the graphical element can include a window.

As shown in FIG. 2B, in addition to displaying the graphical element, the social networking application 106 maintains a display of the graphical element while the web browser navigates (e.g., is caused to be navigated) through a plurality of different web pages of the merchant's website, as shown in step 224. For example, the social networking application 106 maintains a display of the graphical element as a user 110 navigates the web browser to display different web pages of a checkout process within the merchant's website. In one or more embodiments, the graphical element disappears (e.g., the social networking application 106 stops displaying the graphical element) when the web browser leaves the merchant's website. In alternative embodiments, the graphical element remains displayed (e.g., the social networking application 106 continues to display the graphical element) when the web browser leaves the merchant's web site.

Referring still to FIG. 2B, while displaying the graphical element, the social networking application 106 of the client device 102 detects a user interaction with the graphical element, as shown in step 226. For example, as mentioned briefly above, the graphical element may include one or more selectable elements (e.g., the second plurality of selectable elements), and the social networking application 106 and/or the client device 102 can detect a user interaction with the one or more selectable elements. As an example and not by way of limitation, the content of the graphical element may include selectable elements such as a "Copy Code" button and/or an "Apply Code" button.

Upon detecting a user interaction with the graphical element, the social networking application 106 causes the offer associated with the graphical element to be at least partially applied to a potential purchase (e.g., a purchase in progress) of a product in the merchant's website, as shown in step 228 of FIG. 2B. For example, the selectable elements (e.g., the second plurality of selectable elements) of the graphical element may include a first selectable element and a second selectable element, and upon detection of a user interaction with the first selectable element, the social networking application 106 causes the offer associated with the graphical element to be at least partially applied to a potential purchase.

As a non-limiting example, as noted above, in some embodiments, the required elements of the graphical element may include a coupon code that is required to redeem the offer. In such embodiments, upon detecting a user interaction with the first selectable, the social networking application 106 causes the coupon code of the graphical element to be copied to a clipboard of the social networking application 106. After which, the user can paste the coupon code into an appropriate field (e.g., input box for accepting coupon codes) of the merchant's website and interact with the merchant's website to fully apply the offer to a potential purchase (e.g., apply coupon code to a purchase).

In alternative embodiments, upon detecting a user interaction with the first selectable element, the social networking application 106 causes the coupon code of the graphical element to automatically be copied and pasted into the appropriate field of the merchant's website without further user interaction. In yet further alternative embodiments, upon detecting a user interaction with the first selectable element, the social networking application 106 causes a purchase parameter (e.g., a price) of a product in the merchant's website to automatically be adjusted without copying and pasting a coupon code. In other words, upon detecting a user interaction with the first selectable element, the social networking application 106 causes the offer indicated in the graphical element to automatically be applied to a potential purchase in the merchant's website.

On the other hand, upon detecting a user interaction with the second selectable element of the second plurality of selectable elements of the graphical element, the social media application displays an information window including information related to the offer. The information window is described in greater detail below in regard to FIGS. 3-4E.

Referring to FIG. 2C, in response to applying the offer to a potential purchase, the social networking application 106 of the client device 102 sends a notification to the merchant 112 that the offer has been applied to a potential purchase, as shown in step 232. As a non-limiting example, the social networking application 106 sends a notification to the merchant 112 that the user 110 has applied a coupon code to a potential purchase. In one or more embodiments, the social networking application 106 of the client device 102 sends the notification to the merchant 112 via the social networking system 104.

Upon receiving a notification that the offer has been applied to a potential purchase, in some embodiments, the merchant 112 verifies that the offer is a valid offer, as shown in step 234 of FIG. 2C. For example, the merchant 112 may verify that the offer is correct and still available, that the offer is not expired (e.g., still active), and/or that the particular client device 102 and/or social networking application account is eligible for the offer, etc.

As noted above, the merchant 112 may verify that the offer is correct and still available. For example, the merchant 112 may verify that the offer is being used with a correct product or combination of products. Furthermore, if the offer has a unique coupon code, the merchant 112 verifies that the unique code has not been used previously. Alternatively, if the offer has a general coupon code, the merchant 112 verifies that the coupon code has not been used more than an allotted number of times (e.g., that the offers are still available).

In addition to verifying that the offer is correct, as mentioned briefly above, the merchant 112 may verify that the offer is not expired. For example, the merchant 112 may compare a current date (e.g., a date at which the user 110 is attempting to redeem an offer) to an expiration date provided in the offer information to the social networking system 104 by the merchant 112.

Furthermore, beyond verifying that the offer is correct and has not expired, as discussed briefly above in regard to step 207 of FIG. 2A, in some embodiments, the merchant 112 may optionally verify that the client device 102 upon which the user 110 is attempting to redeem the offer and/or the user's social networking application account is eligible for the offer. For example, the merchant 112 may compare a serial number of the client device 102 attempting to redeem the offer with a serial number tied to the offer, as discussed above in regard to step 207. Furthermore, the merchant 112 may compare a user's social networking application account through which the user 110 is attempting to redeem the offer with a user's social networking application account tied to the offer.

Referring to FIG. 2C, upon verifying that the offer is valid, the merchant 112 may adjust one or more purchase parameters (e.g., price, shipping cost, etc.) of the potential purchase to match the offer (e.g., satisfy the offer), as shown in step 236. Conversely, upon determining that the offer is not valid, the merchant 112 does not adjust the purchase parameters of the potential purchase.

In response to adjusting the purchase parameters, the merchant 112 sends the adjusted purchase parameters to the client device 102 (e.g., to the social networking application 106 of the client device 102), as shown in step 238 of FIG. 2C. In some embodiments, the merchant 112 sends the adjusted purchase parameters to the client device 102 via the social networking system 104. Conversely, in cases where the merchant 112 determines that the offer is not valid, the merchant 112 may send a notification (e.g., a message) that the offer has not been accepted to the client device 102, as shown in step 240 of FIG. 2C. Furthermore, in one or more embodiments, the merchant 112 sends the notification to the client device 102 via the social networking system 104.

After receiving the adjusted purchase parameters of the potential purchase, the social networking application 106 and/or the client device 102 displays the adjusted purchase parameters (e.g., within the merchant's website) and maintains a display of the graphical element while the web browser navigates to a checkout web page of the merchant's web site, as show in step 242 of FIG. 2C. In other words, the social networking application 106 maintains a display of the graphical element throughout a purchase of a product associated with the offer within the merchant's web site.

In comparison to conventional electronic offer systems (e.g., electronic coupons and coupon sites) (referred to hereinafter as "conventional offer systems"), the graphical element of the present disclosure is advantageous. For example, conventional offer systems typically provide (e.g., display) a coupon code on a first website (e.g., coupon website) and require the user 110 to manually copy and/or type the coupon code into input fields of a second website (e.g., merchant website) while flipping back and forth between the coupon site and the merchant's website. Furthermore, when the coupon code is provided in a social networking application 106, conventional offer systems require the user 110 to flip back and forth between the social networking application 106 and a web browsing application to use the coupon. Such flipping back and forth between applications can be cumbersome and may result in the user 110 not correctly using the coupon code and/or abandoning an effort to use the coupon code in the first place.

On the other hand, the graphical element of the present disclosure does not require a second coupon site to be open because the graphical element overlays the merchant's website. Furthermore, because the graphical element overlays the merchant's website, any need to flip back and for the between applications (e.g., a social networking application 106 and a web browsing application) is removed. As a result, the coupon code is always visible and readily available to the user 110 for reference throughout an entire checkout process. Furthermore, the graphical element, as described above, may not require manually copying and/or typing the coupon code into an input field. Rather, merely clicking the graphical element, as described above, causes the coupon code, in some embodiments, to automatically be copied and pasted into appropriate input fields. Thus, the graphical element of the present disclosure may provide a faster and more convenient checkout process for users 110. This may result in more coupons being redeemed, which results in increased sales and revenue for the merchant 112.

Furthermore, by not requiring two websites to be open (e.g., running) concurrently and/or two applications to be open concurrently, the graphical element of the present disclosure, in comparison to conventional offer systems, requires less processing capabilities from the client device 102 and/or the social networking system 104. By requiring less processing capabilities, the graphical element requires less power (e.g., battery life) and less memory of the client device 102. Furthermore, by requiring less processing capabilities and memory, the graphical element of the present disclosure allows for more applications and/or websites (e.g., applications and/or websites unrelated to the graphical element) to be running concurrently with the graphical element. As a result, the graphical element of the present disclosure improves performance of the client device 102 and/or the social networking system 104.

Moreover, when using conventional offer systems, users may forget the coupon code and/or where the users originally obtained the coupon code. As result, the coupon codes are often not redeemed because the coupon codes are forgotten and/or lost. On the other hand, because the graphical element of the present disclosure maintains a display of the coupon code throughout a checkout process, the graphical element removes any likelihood that the user 110 might forget the coupon code. In view of the foregoing, the graphical element of the present disclosure provides advantages over conventional offer systems.

Figure 3:
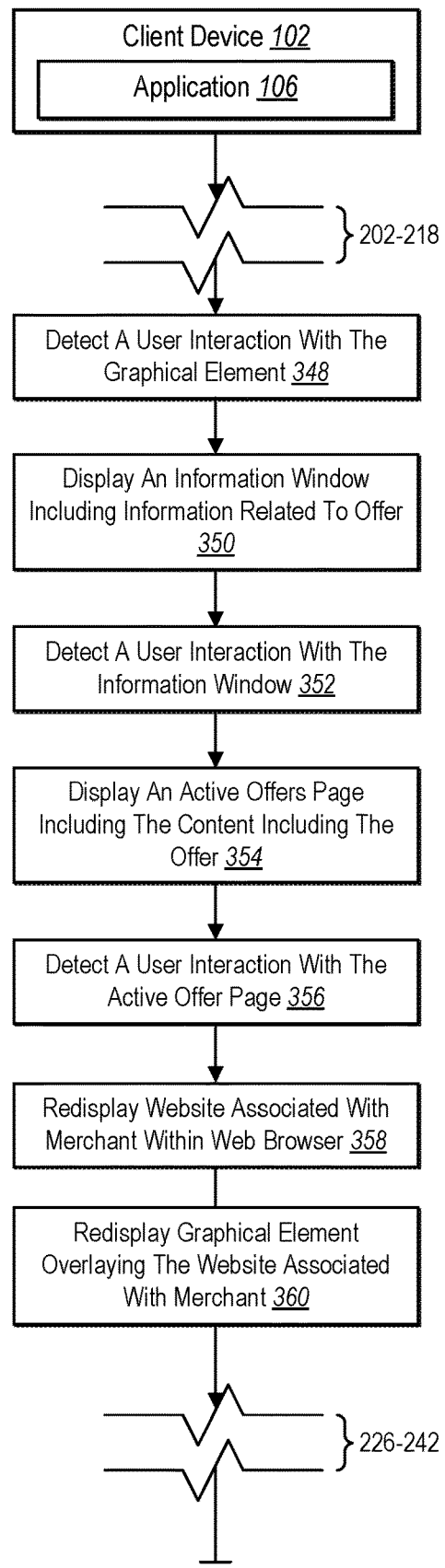
FIG. 3 illustrates a partial sequence-flow diagram illustrating interactions in a communication process between a user and a merchant via a social networking system according to alternative embodiments of the present disclosure.

FIG. 3 illustrates a partial sequence-flow method showing the social networking application 106 of the client device 102 displaying a graphical element associated with an offer overlaying a web browser according to another embodiment of the present disclosure. The communication system 100 and client device 102 shown in FIG. 3 may be example embodiments of the communication system 100 and client device 102 described in regard to FIGS. 1 and 2A-2C.

Similar to the communication system 100 shown in FIGS. 2A-2C, the communication system 300 of FIG. 3 performs the same steps 202-226 described above in regard to FIGS. 2A-2C. Furthermore, as discussed briefly above in regard to FIGS. 2A-2C and as illustrated the social networking application 106 of the client device 102 detects a user interaction with the second selectable element of the graphical element, as shown in step 348, as shown in FIG. 3. For example, the social networking application 106 of the client device 102 may detect a user interaction with the second selectable element in any of the manners described above in regard to FIGS. 2A-2C.

As illustrated in FIG. 3, in response to detecting a user interaction with the second selectable element of the graphical element, the social networking application 106 displays an information window including information related to the offer, as shown in step 350. In some embodiments, the information window overlays the merchant's website. In alternative embodiments, the social networking application 106 opens (e.g., displays) the information window as a new display (e.g., a new page) within the social networking application 106.

While the information window is displayed, the social networking application 106 maintains a display of the graphical element. In other words, the social networking application 106 displays the graphical element overlaying a portion of the information window. Furthermore, while the information window is displayed, detecting a user interaction with the first selectable element of the graphical element causes the same results as described above in regard to step 228 of FIG. 2B.

The information window may include details related to the offer such as expirations dates and Terms & Conditions, etc. Furthermore, the information window may include selectable elements (e.g., a third plurality of selectable elements) to allow the user to interact with the information window. As a non-limiting example, the selectable elements of the information window may include a "Save for Later" button for saving the offer for later user, a "Mark as Used" button to mark the offer as used, and a "Share Offer" button for sharing the offer within the user's social networking application account (e.g., on the user's wall, timeline, newsfeeds, etc.). In some embodiments, the selectable elements of the information window may further include a "Go to Offers" button.

Furthermore, the social networking application 106 and/or client device 102 detects a user interaction with the information window, as shown in step 352 of FIG. 3. For example, the social networking application 106 of the client device 102 may detect a user interaction with the selectable elements of the information window (e.g., the "Go to Offers" button of the information window).

In response to detecting a user interaction with the information window, the social networking application 106 of the client device 102 displays an active offers page of the user's social networking application account, as shown in step 354 of FIG. 3. In some embodiments, the active offers page includes one or more content items (e.g., content) associated with offers from merchants 112 (e.g., saved offers from merchants). As a non-limiting example, the active offers page includes the content described above in regard to FIGS. 2A-2C. In some embodiments, the active offers page may include content associated with offers that have been previously offered to the user 110 (e.g., the user's social networking application account) and are still active (e.g., not expired). In additional embodiments, the active offers page may include content that the user saved within the active offers via, e.g., the "Save for Later" button as described above. In one or more embodiments, the content within the active offer page are saved automatically by the social networking application 106 whenever an offer is provided to the user.

Because the user 110 can save the content associated with the offer for later within the active offers pages of the social networking application 106, the active offers page of the present disclosure provides advantages over conventional offer systems. For example, as discussed above, in some instances, a user 110 may forget the required elements (e.g., coupon codes) of an offer and/or where the user 110 discovered the offer. As a result, conventional offer systems, which do not include the active offers page of the present disclosure, often lead to a user 110 not being able to redeem the offer code due to the user 110 forgetting and/or losing the required elements of the offer. This leads to less offers being redeemed and less realized sales (e.g., revenue) for the merchant 112. On the other hand, the active offers page of the present disclosure allows the user 110 to save offers (and the offers' respective required elements) for a later time such that the user 110 will not lose the required elements of an offer. This may lead to more offers being redeemed with the merchant 112 and increased sales for the merchant 112.

Furthermore, being able to save the offer for later, may allow users 110 who do not have time to redeem the offer immediately (e.g., when originally offered the offer) to redeem the offer later. Again, this may lead to more offers being redeemed with the merchant 112 and increased sales for the merchant 112. In view of the foregoing, the offer system (e.g., the graphical element and active offers page) of the present disclosure may be a more attractive avenue (e.g., pathway) for merchants 112 to distribute offers in comparison to conventional offer systems.

Referring again to FIG. 3, the content displayed within the active offers includes the first plurality of selectable elements described above in regard to FIG. 2A, and the social networking application 106 detects a user interaction with the first plurality selectable elements of the content, as shown in step 356. Upon detecting user interaction with the first plurality of selectable elements of the content within the active offers page, the social networking application redisplays the web browser and the merchant's website within the web browser, as shown in step 358 of FIG. 3. Additionally, upon detecting a user interaction with the first plurality of selectable elements of the social media, the social networking application 106 redisplays the graphical element overlaying at least a portion of the merchant's website within the web browser. For example, the social networking application 106 can display the graphical element in any of the manners described above in regard to FIGS. 2A-2C.

In response to the social networking application 106 redisplaying the web browser, the merchant's website, and the graphical element, the communication system of FIG. 3 may also perform any of the steps 226-242 described above in regard to FIGS. 2A-2C.

FIGS. 4A-4E illustrate a flow 400 of user interfaces including features of the communication system 100 according to one or more embodiments of the present disclosure. As will be described in more detail below, the components of the communication system 100 as described in regard to FIGS. 1-3 can provide, along and/or in combination with the other components, one or more graphical user interfaces ("GUIs"). In particular, the components can allow a user 110 to interact with a collection of display elements for a variety of purposes. In particular, FIGS. 4A-4E and the description that follows illustrate various example embodiments of the user interfaces and features that are in accordance with one or more embodiments of the present disclosure.

Figures 4A, 4B:
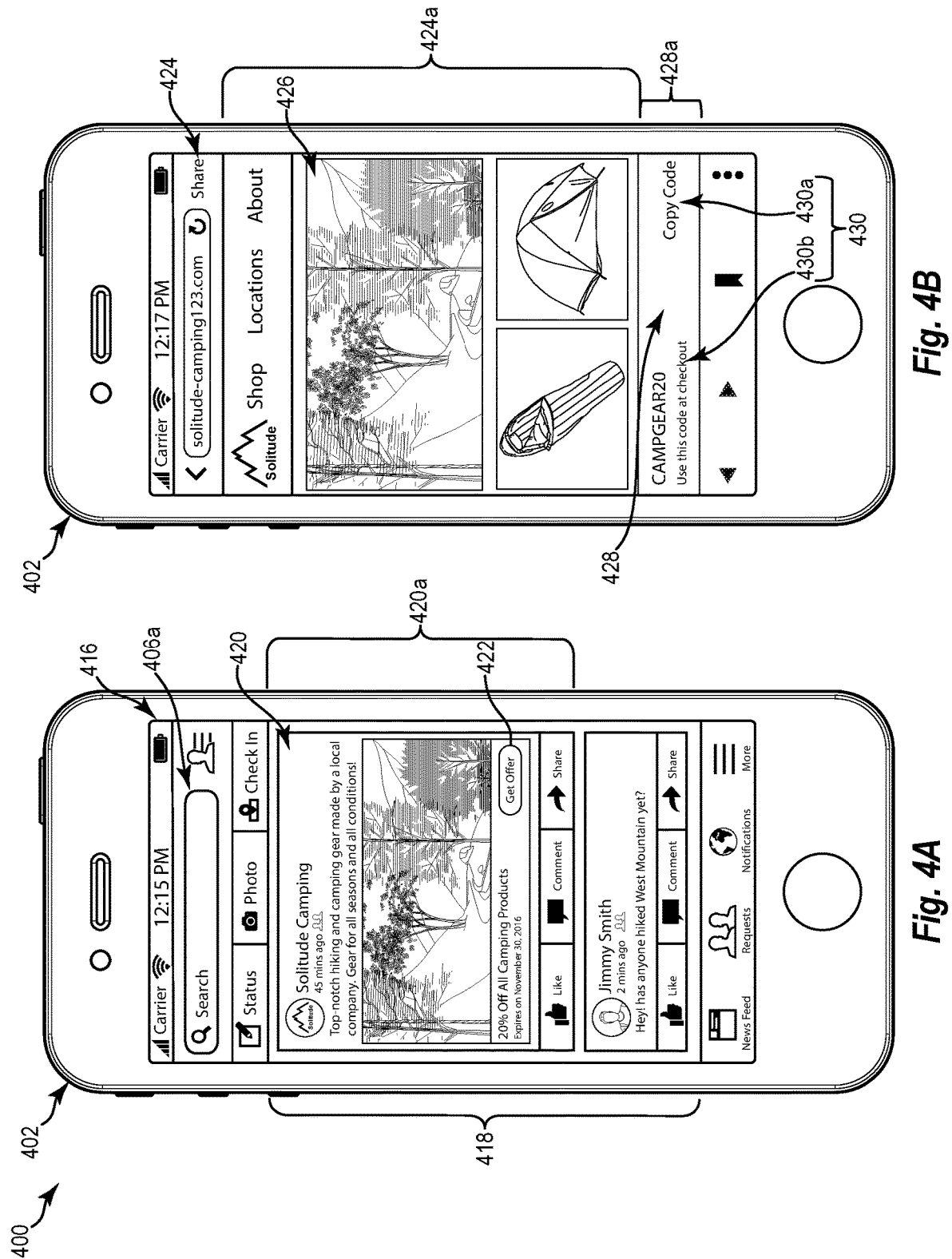

For example, FIG. 4A illustrates a client device 402 of a social networking system user (e.g., the user 110 of FIG. 1) that may implement one or more of the components or features of the communication system 100. As shown in FIG. 4A, in some embodiments, the client device 402 is a handheld device, such as a mobile phone device (e.g., a smartphone). As used herein, the term "handheld device" refers to a device sized and configured to be held/operated in a single hand of a user. In additional or alternative examples, however, any other suitable computing device, such as, but not limited to, a tablet device, larger wireless device, laptop or desktop computer, a personal digital assistant device, and/or any other suitable computing device can perform one or more of the processes and/or operations described herein.

The client device 402 includes a touch screen display 416 that can display user interfaces. Furthermore, the client device 402 receives and/or detects user input via the touch screen display 416. As used herein, a "touch screen display" refers to the display of a touch screen device. In one or more embodiments, a touch screen device may be the client device 402 with at least one surface upon which a user may perform touch gestures (e.g., a laptop, a tablet computer, a personal digital assistant, a media player, a mobile phone, etc.). Additionally or alternatively, the client device 402 may include any other suitable input device, such as a touch pad or those described below with reference to FIGS. 7 and 8.

As shown in FIG. 4A, the touch screen display 416 of the client device 402 displays a social networking application GUI 406a provided by the social networking application 106 installed on the client device 402. The social networking application GUI 406a displays a user's newsfeed 418. The newsfeed 418 includes content 420 (e.g., social networking content) associated with an offer from a merchant 112 such as the content and offers described above in regard to FIGS. 1-3. The content 420 may include content and selectable options associated with an offer available to the user. As illustrated in FIG. 4A, the content 420 may include details regarding the offer, images of a product associated with the offer, and a first plurality of selectable elements 422 to interact with the content 420. For example, in some embodiments, and as described above in regard to FIGS. 2A-2C, the first plurality of selectable elements 422 may include a "Get Offer" button to begin a redemption of the offer of the content 420.

Referring to FIGS. 4A and 4B together, the client device 402 and social networking application 106 may detect a user interaction (e.g., clicking or tapping) with the first plurality of selectable elements 422 via the touch screen display 416 and the content GUI 422a. As discussed in greater detail above in regard to FIGS. 2A-2C, in response to detecting a user interaction with the first plurality of selectable elements 422 of the content 420, the social networking application 106 opens and displays a web browser 424 within the social networking application 106 (e.g., an integrated web browser), as shown in FIG. 4B. The web browser 424 of the social networking application 106 provides a web browser GUI 424a to provide an interactive display whereby a user 110 can read and interact with a web page of the web browser 424. Furthermore, as discussed above, the social networking application 106 causes the web browser 424 to display a merchant's website 426 in the web browser GUI 424a on the touch screen display 416 of the client device 402, as illustrated in FIG. 4B.

Furthermore, in response to detecting a user interaction with the first plurality of selectable elements 422, the social networking application 106 generates and displays a graphical element 428 including content associated with the offer. For example, the social networking application 106 generates and displays a graphical element 428 as described above in regard to FIGS. 2A-2C. The graphical element 428 provides a graphical element GUI 428a to provide an interactive display whereby a user 110 can view and interact with the graphical element 428. As shown in FIG. 4B, the social networking application 106 displays the graphical element 428 overlaying (e.g., being displayed over) a portion of the merchant's website 426 in the web browser GUI 424a. Furthermore, the social networking application 106 maintains a display of the graphical element 428 as the web browser 424 displays (e.g., navigates through) different web pages of the merchant's website 426 in the web browser GUI 424a.

As discussed above in regard to FIGS. 2A-2C and as shown in FIG. 4B, the graphical element 428 include may include any required elements for redeeming the offer (e.g., coupon codes), text indicating the offer, instructions on how to redeem the offer, and a second plurality of selectable elements 430. In some embodiments, a first selectable element 430a of the second plurality of selectable elements 430 may include "Copy Code" button. In additional embodiments, a second selectable element 430b of the second plurality of selectable elements 430 may include the text representing the offer itself and/or the instructions on how to redeem the offer.

Figure 4E:
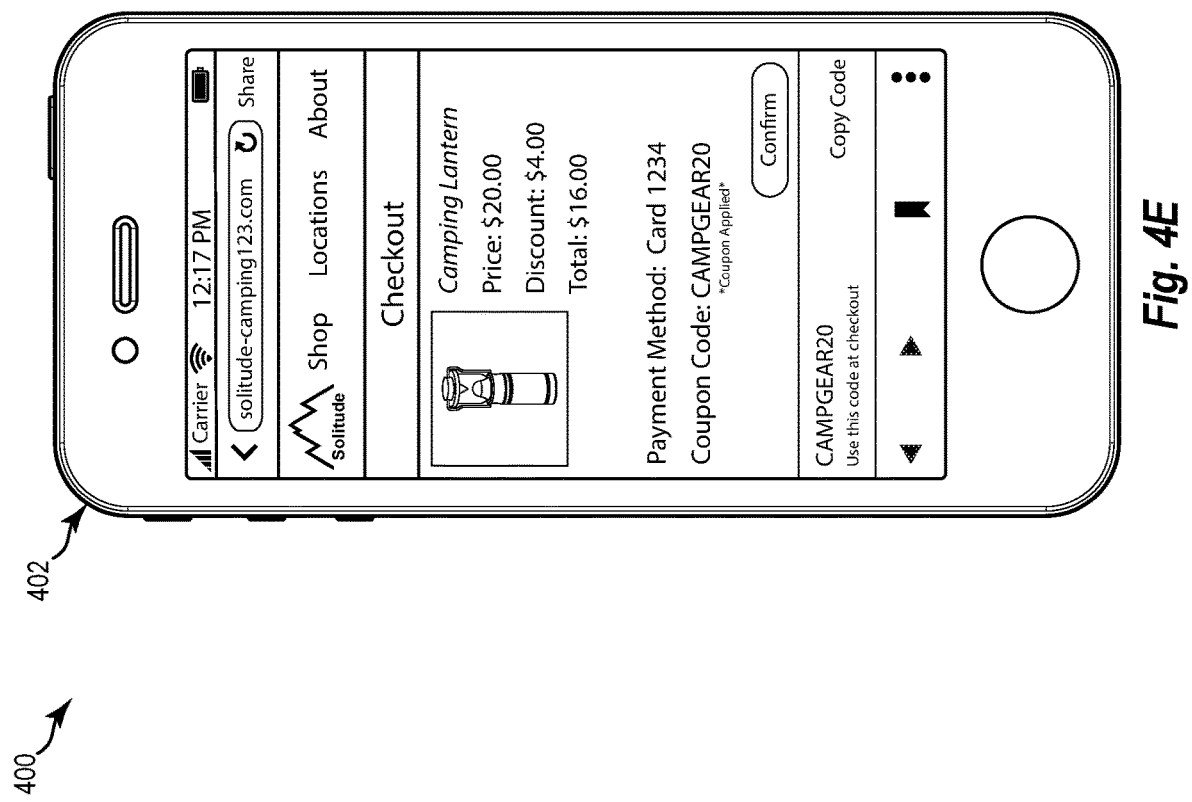

As discussed above, the social networking application 106 maintains a display of the graphical element 428 as the web browser GUI 424a displays (e.g., navigates through) different web pages of the merchant's website 426. Furthermore, the social networking application 106 maintains a display of the graphical element 428 as the web browser GUI 424a displays a check out web page of the merchant's website 426, as shown in FIG. 4E. Furthermore, referring to FIGS. 4B and 4E together, the client device 402 and social networking application 106 may detect a user interaction with the first selectable element 430a of the second plurality of selectable elements 430 via the touch screen display 416. In response to detecting a user interaction with the first selectable element 430a of the second plurality of selectable elements 430, the social networking application 106 may cause any of the results discussed above in regard to step 228 of FIG. 2B.

Referring again to 4B, the client device 402 and social networking application 106 may detect a user interaction with the second selectable element 430b of the second plurality of selectable elements 430 of the graphical element 428 via the touch screen display 416. In response to detecting user interaction with the second selectable element 430b of the plurality of selectable elements 430, the social networking application 106 of the client device 402 opens and displays an information window 432 associated with the offer within the social networking application 106, as show in FIG. 4C. In other words, in response to the user 110 of the client device 402 tapping the text of the coupon or the instructions of the graphical element 428, the social networking application 106 opens and displays the information window 432 related to the offer. The information window 432 provides an information window GUI 432a to provide an interactive display whereby a user can view and interact with the information window 432. As discussed above, in some embodiments, the information window GUI 432a overlays the merchant's website 426 in the web browser GUI 424a. In alternative embodiments, the social networking application 106 opens the information window GUI 432a as a new display (e.g., a new page) within the social networking application 106.

While the information window GUI 432a is displayed, the social networking application 106 maintains a display of the graphical element GUI 428a. In other words, the social networking application 106 displays the graphical element GUI 428a overlaying a portion of the information window GUI 432a. Furthermore, while the information window GUI 432a is displayed, in response to detecting a user interaction with the first selectable element 430a of the second plurality of selectable elements 430 of the graphical element 428, the social networking application 106 causes the same results as described above in regard to FIGS. 4B and 4E.

The information window 432 may include any of the elements described above in regard to FIG. 3. For example, referring to FIGS. 4C and 4D together, in some embodiments, the third plurality of selectable elements 434 may include a "Go to Offers" button 436. Furthermore, in response to detecting a user interaction with the "Go to Offers" button 436, the social networking application 106 displays an active offers page 438 within the social networking application GUI 406a, as shown in FIG. 4D. As discussed above in regard to FIG. 3, the active offers page 438 may include a list (e.g., a collection) of the user's current offers. Additionally, the active offers page 438 may include content 420 associated with offers from merchants.

Furthermore, as described above in regard to FIG. 3, in response to detecting a user interaction with the "Get Offer" button 436 of the content 420 within the active offers page 438, the social networking application 106 reopens and redisplays the merchant's website 426 within web browser GUI 424a within the social networking application 106, as shown in FIG. 4B. Moreover, in response to detecting a user interaction with the "Get Offer" button 436, the social networking application 106 redisplays the graphical element 428 including content associated with the offer.

After redisplaying the merchant's website 426 and the graphical element 428, the social networking application 106 maintains a display of the graphical element 428 as the web browser GUI 424a displays (e.g., navigates through) different web pages of the merchant's website 426 and throughout a checkout process, as described above in regard to FIGS. 4B and 4E.

Referring to FIGS. 4A-4E together, although the selectable elements 430, 434, 436 of the content 420, the graphical element 428, and the information window 432 are described herein with specifics descriptions (e.g., specific displayed texts and functions), the disclosure is not so limited. Rather, one of ordinary skill in the art, when considering the present disclosure, will readily recognize that the selectable elements 430, 434, 436 may include different texts and functions and still fall within the scope of the present disclosure.

Figure 5:
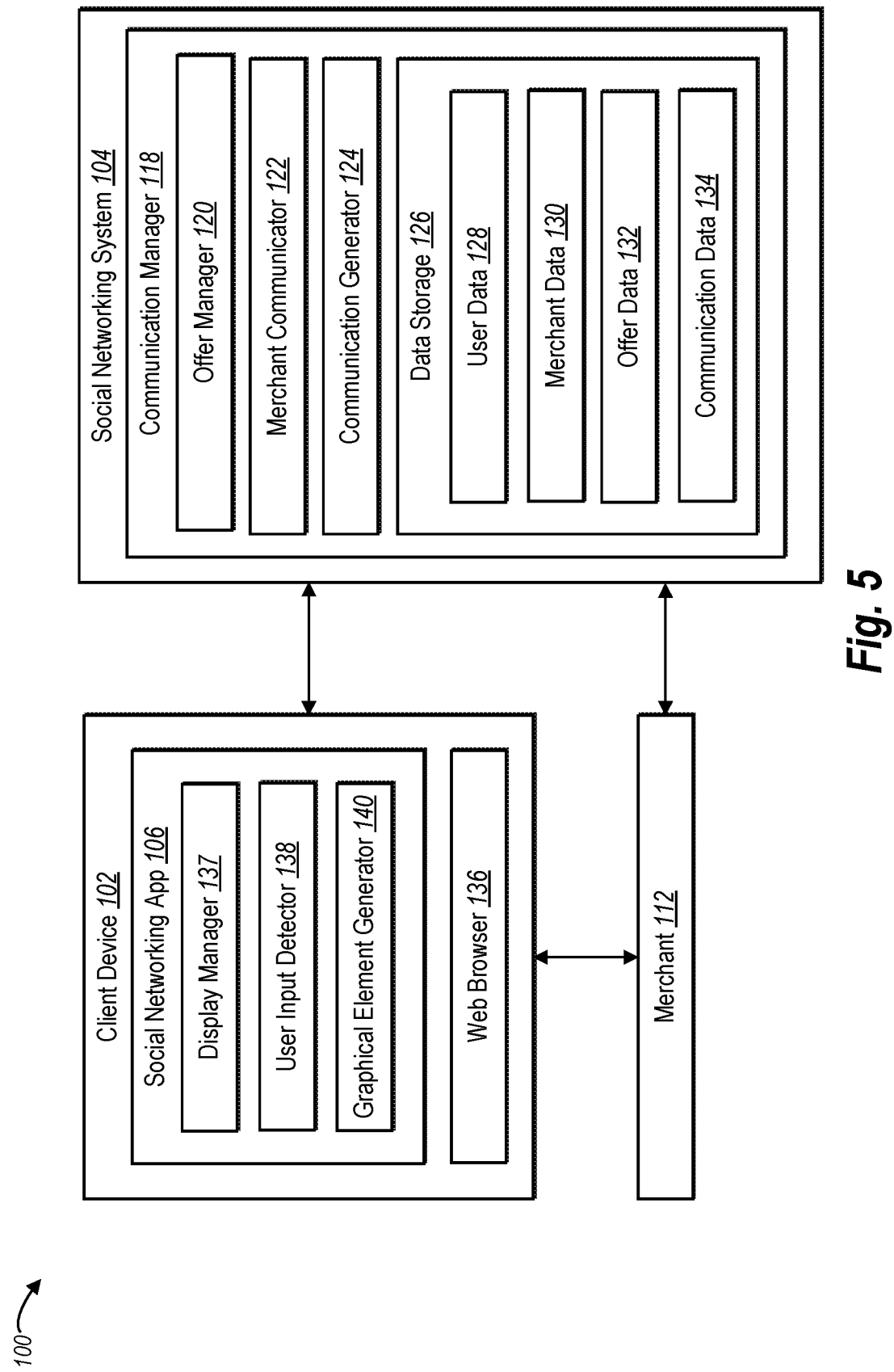
FIG. 5 illustrates a detailed schematic diagram of a communication system in accordance with one or more embodiments.

FIG. 5 illustrates a detailed schematic diagram illustrating the communication system 100 of FIG. 1, For example, as described above, the communication system 100 includes the social networking system 104, the merchant 112, and one or more client devices 102.

The social networking system 104, the client device 102, and the merchant 112 can be implemented using a computing device including at least one processor executing instructions that cause the communication system 100 to perform the processes described herein. In some embodiments, the social networking system 104, the client device 102, and the merchant 112 can all be implemented by a single server device, or across multiple server devices. Additionally or alternatively, a combination of one or more server devices and one or more client devices can implement the social networking system 104, the client device 102, and the merchant 112. Furthermore, in one embodiment, the social networking system 104, the client device 102, and the merchant 112 can comprise hardware, such as a special-purpose processing device to perform a certain function. Additionally or alternatively, the social networking system 104, the client device 102, and the merchant 112 can comprise a combination of computer-executable instructions and hardware.

In some embodiments, the social networking system 104 may include a communication manager 114. The communication manager 114 includes, but is not limited to, an offer manager 120, a merchant communicator 122, a communication generator 124, and data storage 126, which includes user data 128, merchant data 130, offer data 132, and communication data 134. The communication manager 114 manages all communication between the social networking system 104, the social networking system users 110, and/or third parties (i.e., the merchant 112).

The merchant communicator 122 of the communication manager 114 communicates with particular merchants 112. For example, in some embodiments, a merchant 112 sends a communication with offer information to the communication manager 114, and the merchant communicator 122 receives the offer information from the merchant 112. The merchant communicator 122 provides the offer information to the offer manager 120. The offer information may include any of the elements described above in regard to FIGS. 2A-2C.

After receiving the offer information from the merchant communicator 122, the offer manager 120 can send the offer information to the communication generator 124. The communication generator 124 and/or the offer manager 120 may generate the content 420 (FIG. 4A) associated with the offer, as described above in regard to FIGS. 2A-2C and 4B. Furthermore, the communication manager 114 may communicate the content 420 to the client device 102, as described above in regard to FIG. 3.

The social networking system 104 can provide social networking posts and messages (whether text or otherwise) to one or more users 110 of the social networking system 104 (e.g., by way of a profile, a newsfeed 418, a communication thread, a timeline, or a "wall"). For example, in some embodiments, the communication system 100 may present a user 110 with a social networking system newsfeed 418 and electronic messages from one or more co-users associated with the user 110 via the social networking system 104. In one or more embodiments, the user 110 scrolls through the social networking system newsfeed 418 in order to view recent social networking system posts submitted by the one or more co-users associated with the user 110 via the social networking system 104. In some embodiments, the social networking system 104 organizes the social networking system posts chronologically in a user's social networking system newsfeed 418. In alternative embodiments, the social networking system 104 organizes the social networking system posts geographically, by interest groups, according to a relationship coefficient between the user 110 and the co-user, etc. Additionally, in one or more embodiments, the user 110 can download a copy of the social networking system newsfeed 418 as a record of the social networking system posts displayed thereon.

Additionally, in one embodiment, the social networking system 104 transmits social networking system posts and/or electronic messages between users. For example, in response to a user submitting an electronic message to one or more social networking system users via the social networking system 104, the social networking system 104 updates the communication threads of other participants in the communication session to include the electronic message. In additional or alternative embodiments, the social networking system 104 further provides additional indicators within a communication thread that indicate whether a particular user in the communication session has seen or read a particular electronic message within the communication thread.

Furthermore, as mentioned above, and as illustrated in FIG. 5, the communication manager 114 also includes a data storage 126. As shown, the data storage 126 includes user data 128, merchant data 130, offer data 132, and communication data 134. In one or more embodiments, the user data 128 is representative of user information, such as described herein. Similarly, in one or more embodiments, the merchant data 130 is representative of merchant information, such as described herein. In some embodiments, the communication data 134 is representative of communication information, such as described herein. Further, in one or more embodiments, the offer data 132 is representative of offer information, such as described herein.

As shown in FIG. 5, the social networking application 106 may include a display manager 137, a user input detector 138, and a graphical element generator 140. The display manager 137 can provide, manage, and/or control a graphical user interface (or simply "user interface") that allows the user 110 to compose, view, and submit social networking system posts and messages. For example, the display manager 137 provides a user interface that facilitates the display of a social network system user's newsfeed 418, wall, communication threads, etc. Similarly, the display manager 137 provides a user interface that displays one or more electronic messages or communication threads received by a social network system user 110.

More specifically, the display manager 137 facilitates the display of a user interface (e.g., by way of a display device associated with the client device 102). For example, the display manager 137 may compose the user interface of a plurality of graphical components, objects, and/or elements that allow a user 110 to compose, send, and receive electronic messages, and/or social networking system posts. More particularly, the display manager 137 may direct the client device 102 to display a group of graphical components, objects, and/or elements that enable a user to view electronic messages, communication threads, offers, or social networking system posts.

In addition, the display manager 137 directs the client device 102 to display one or more graphical objects, controls, or elements that facilitate user input for composing, sending, and/or submitting a social networking system post, and/or an electronic message. To illustrate, the display manager 137 provides a user interface that allows a user 110 to provide user input to the social networking application 106. For example, the display manager 137 provides one or more user interfaces that allow a user 110 to input one or more types of content into a social networking system post or electronic message. As used herein, "content" refers to any data or information to be included as part of a social networking system post or electronic message. For example, the term "content" will be used herein to generally describe text, images, digital media, files, location information, payment information, or any other data that can be included as part of a social networking system post or electronic message.

The display manager 137 can also facilitate the input of text or other data to be included in a social networking system post or electronic message. For example, the display manager 137 provides a user interface that includes a touch display keyboard. A user 110 can interact with the touch display keyboard using one or more touch gestures to input text to be included in a social networking system post or electronic message. For example, a user can use the touch display keyboard to compose a message. In addition to text, the user interface, including the touch display keyboard, can facilitate the input of various other characters, symbols, icons, or other information.

Furthermore, the display manager 137 is capable of transitioning between two or more graphical user interfaces. For example, in one embodiment, the display manager 137 provides a newsfeed 418 to a social networking system user containing one or more social networking system posts from co-users associated with the user via the social networking system 104. Later, in response to detected input from the user, a GUI manager (not shown) transitions to a second graphical user interface that includes a listing of one or more communication threads between the user and other parties.

As noted above, the social networking application 106 includes the user input detector 138. In some embodiments, the input detector 138 can detect, receive, and/or facilitate user input in any suitable manner. In some examples, the input detector 138 detects one or more user interactions with respect to the user interface. For example, input detector 138 detects a user interaction from a keyboard, mouse, touch page, touch screen, and/or any other input device. In the event the client device 102 includes a touch screen, the input detector 138 detects one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The input detector 138 may additionally, or alternatively, receive data representative of a user interaction. For example, input detector 138 may receive one or more user configurable parameters from a user, one or more user commands from the user, and/or any other suitable user input. The input detector 138 may receive input data from one or more components of the social networking system 104, or from one or more remote locations.

The social networking application 106 performs one or more functions in response to the input detector 138 detecting user input and/or receiving other data. Generally, a user 110 can control, navigate within, and otherwise use the social networking application 106 by providing one or more user inputs that the input detector 138 can detect. For example, in response to the input detector 138 detecting user input, one or more components of the social networking application 106 allow a user 110 to select a recipient for a message, compose a message, select content to include in a message, and/or send a message to the recipient. Additionally, in response to the input detector 138 detecting user input, one or more components of the social networking application 106 allow a user 110 to navigate through one or more user interfaces to review and respond to received electronic messages, etc. Furthermore, as will be discussed in greater detail below, in response to the input detector 138 detecting user input, the graphical element generator 140 of the social networking application 106 may generate a graphical element 428, as described above in regard to FIGS. 2A-2C and 4B.

The graphical element generator 140 of the social networking application 106 may communicate with the social networking system 104 and may receive the content 420 and any offer information associated with the content 420 (e.g., offer information provided by the merchant 112). The graphical element generator 140 may generate graphical elements 428 to be displayed by the display manager 137. The graphical elements 428 may include content associated with respective offers, and the graphical elements 428 are generated to overlay a merchant's website 426, as described above in regard to FIGS. 2A-2C.

Also as shown in FIG. 5, the social networking application 106 and/or the client device 102 may include a web browser 136. The web browser 136 is a software application that receives and interactively displays web resources (i.e., web pages). For example, the web browser 136 may include the web browsers 136 described above in regard to FIGS. 2A-2C.

Figure 6:
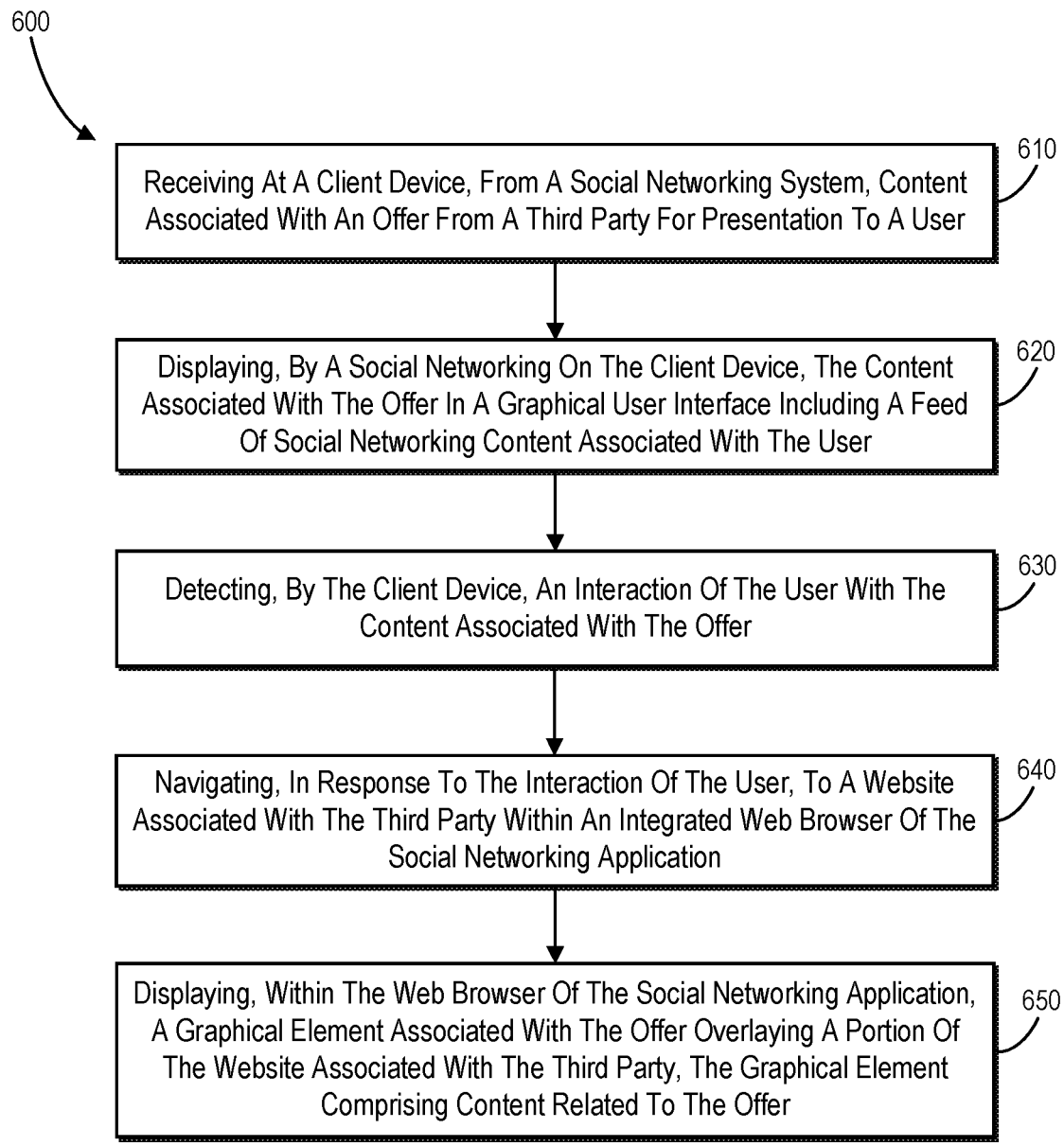
FIG. 6 shows a method flow of providing content to a client device according to an embodiment of the present disclosure.

FIG. 6 illustrates a flowchart of one example method 600 of facilitating communications between a merchant and a social networking system user. The method 600 can be implemented by the communication system 100 described above. The method 600 involves an act 610 of receiving content associated with a third party. For example, act 610 can include receiving at a client device 102, from a social networking system 104, content 420 associated with an offer from a third party for presentation to a user.

Furthermore, the method 600 includes an act 620 of displaying the content 420. For example, act 620 can include displaying, by a social networking application 106 on the client device 102, the content 420 associated with the offer in a graphical user interface including a feed of social networking content associated with the user. In some embodiments, the social networking application 106 of the client device 102 may display the content 420 in any of the manners described above in regard to FIGS. 2A-2C and 4A-4E.

The method 600 also includes an act 630 of detecting an interaction of a user with the content. In particular, act 630 can include detecting, by the client device 102, an interaction of the user with the content 420 associated with the offer. For example, the act 630 can include detecting one or more of clicking, tapping, or otherwise selecting the content 420. Additionally, act 630 may include detecting a user interaction in any of the manners described above in regard to FIGS. 2A-2C and 4A-4E.

Furthermore, the method 600 further includes an act 640 of navigating to a website associated with the third party. For example, act 640 can include navigating, in response to the user interaction, website 426 associated with the third party within an integrated web browser 424 of the social networking application 106. Moreover, act 640 can include any of the actions described above in regard to steps 214-218 of FIGS. 2A and 2B.

Additionally, the method 600 involves an act 650 of displaying a graphical element 428. For example, act 650 can include displaying, within the web browser of the social networking application 106, a graphical element 428 associated with the offer overlaying a portion of the website 426 associated with the third party, the graphical element 428 comprising content related to the offer. In some embodiments, act 650 may involve including, within the graphical element 428, information or instructions for redeeming the offer. In additional embodiments, act 650 may involve including, within the graphical element 428, a coupon code associated with the offer. In some embodiments, the graphical element 428 includes a ribbon overlaying a bottom portion of the merchant's website 426.

Furthermore, the method 600 can involve maintaining the display of the graphical element 428 associated with the offer while the user navigates multiple web pages of the website 426 associated with the third party, the graphical element 428 overlaying a portion of each web page of the multiple web pages. In at least one embodiment, the method 600 further includes maintaining the display of the graphical element 428 associated with the offer while the user navigates to a checkout web page of the website 426 associated with the third party, the graphical element 428 overlaying a portion of the checkout web page.

In some embodiments, the method 600 may further include subsequent to navigating to the web site 426 associated with the third party, detecting an interaction of the user with the graphical element 428 associated with the offer and causing, in response to the interaction of the user with the graphical element 428, the offer to be applied to a potential purchase of a product associated with the offer. Furthermore, causing the offer to be applied to a potential purchase includes copying and pasting a coupon code into a field of the website associated with the third party. In alternative embodiments, causing the offer to be applied to a potential purchase includes adjusting a purchase parameter of the product associated with the offer.

In one or more embodiments, the method may further include subsequent to navigating to the merchant's website 426, detecting a user interaction with the graphical element 428 and displaying, in response to the user interaction with the graphical element 428, an information window 432 comprising information associated with the offer. The information window 432 may include a user selectable element for saving the offer within the social networking application 106 of the client device 102 and a user selectable element 436 for sharing the offer within the social networking system 104. Furthermore, in some embodiments, the information window 432 includes a user selectable element 436, wherein the user interaction with the selectable element 436 causes the social networking application 106 of the client device 102 to display a listing of active offers of the user 110. The listing of active offers of the user 110 comprises another user selectable element, wherein the user interaction with the another user selectable element causes the social networking application 106 of the client device 102 to display a check-out web page of the merchant's website 426 with the offer applied to a potential purchase of a product associated with the offer.

FIGS. 1-6, the corresponding text, and examples, provide a number of different methods, systems, and devices for facilitating communication between a merchant 112 and a social networking system user 110. In addition to the foregoing, embodiments can also be described in terms of flowcharts comprising acts and steps in a method for accomplishing a particular result. For example, FIG. 6 may be performed with less or more steps/acts or the steps/acts may be performed in differing orders. Additionally, the steps/acts described herein may be repeated or performed in parallel with one another or in parallel with different instances of the same or similar steps/acts.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) could be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
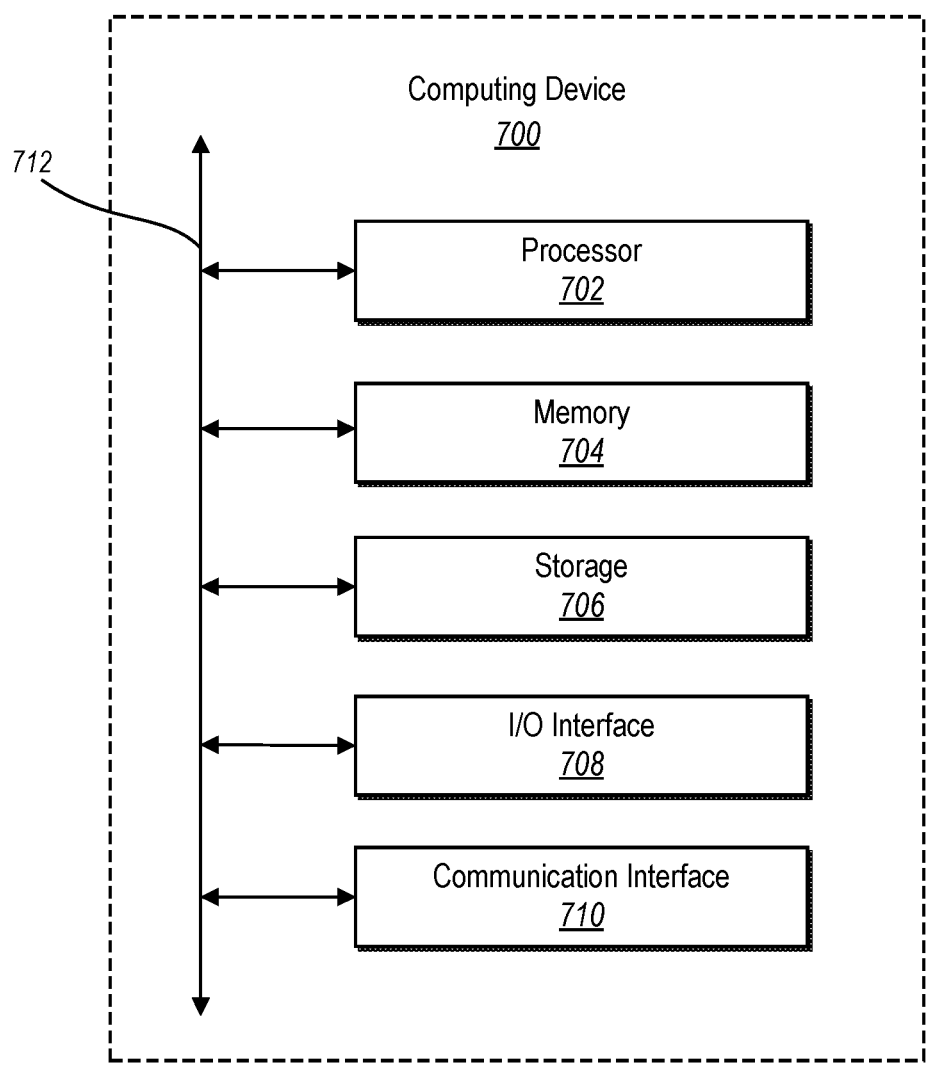
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the system 100. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 8:
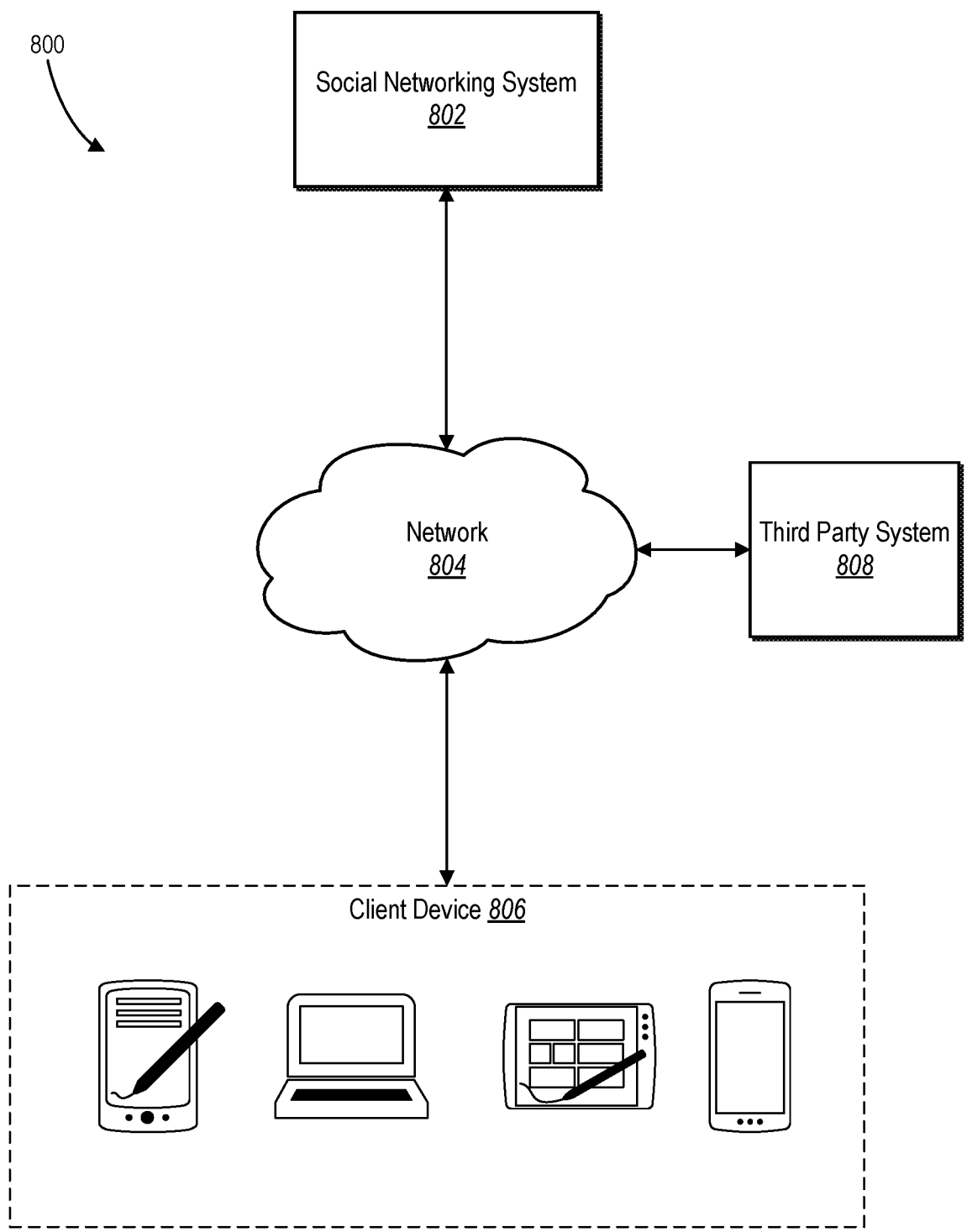
FIG. 8 shows an example network environment of a social networking system in accordance with one or more embodiments.

FIG. 8 illustrates an example network environment 800 of a social networking system. Network environment 800 includes a client device 806, a social networking system 802, and a third-party system 808 connected to each other by a network 804. Although FIG. 8 illustrates a particular arrangement of client device 806, social networking system 802, third-party system 808, and network 804, this disclosure contemplates any suitable arrangement of client device 806, social networking system 802, third-party system 808, and network 804. As an example and not by way of limitation, two or more of client device 806, social networking system 802, and third-party system 808 may be connected to each other directly, bypassing network 804. As another example, two or more of client device 806, social networking system 802, and third-party system 808 may be physically or logically co-located with each other in whole or in part. Moreover, although FIG. 8 illustrates a particular number of client devices 806, social networking systems 802, third-party systems 808, and networks 804, this disclosure contemplates any suitable number of client devices 806, social networking systems 802, third-party systems 808, and networks 804. As an example and not by way of limitation, network environment 800 may include multiple client device 806, social networking systems 802, third-party systems 808, and networks 804.

This disclosure contemplates any suitable network 804. As an example and not by way of limitation, one or more portions of network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 804 may include one or more networks 804.

Links may connect client device 806, social networking system 802, and third-party system 808 to communication network 804 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client device 806 may be an electronic device including hardware, software, or embedded logic components or a combination of two or more such components and capable of carrying out the appropriate functionalities implemented or supported by client device 806. As an example and not by way of limitation, a client device 806 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 806. A client device 806 may enable a network user at client device 806 to access network 804. A client device 806 may enable its user to communicate with other users at other client devices 806.

In particular embodiments, client device 806 may include a web browser, such as MICROSOFT INTERNET EXPLORER, GOOGLE CHROME or MOZILLA FIREFOX, and may have one or more add-ons, plugins, or other extensions, such as TOOLBAR or YAHOO TOOLBAR. A user at client device 806 may enter a Uniform Resource Locator (URL) or other address directing the web browser to a particular server (such as server, or a server associated with a third-party system 808), and the web browser may generate a Hyper Text Transfer Protocol (HTTP) request and communicate the HTTP request to server. The server may accept the HTTP request and communicate to client device 806 one or more Hyper Text Markup Language (HTML) files responsive to the HTTP request. Client device 806 may render a web page based on the HTML files from the server for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

In particular embodiments, social networking system 802 may be a network-addressable computing system that can host an online social network. Social networking system 802 may generate, store, receive, and send social-networking data, such as, for example, user-profile data, concept-profile data, social-graph information, or other suitable data related to the online social network. Social networking system 802 may be accessed by the other components of network environment 800 either directly or via network 804. In particular embodiments, social networking system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 806, a social networking system 802, or a third-party system 808 to manage, retrieve, modify, add, or delete, the information stored in data store.

In particular embodiments, social networking system 802 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 802 may provide users of the online social network the ability to communicate and interact with other users. In particular embodiments, users may join the online social network via social networking system 802 and then add connections (e.g., relationships) to a number of other users of social networking system 802 whom they want to be connected to. Herein, the term "friend" may refer to any other user of social networking system 802 with whom a user has formed a connection, association, or relationship via social networking system 802.

In particular embodiments, social networking system 802 may provide users with the ability to take actions on various types of items or objects, supported by social networking system 802. As an example and not by way of limitation, the items and objects may include groups or social networks to which users of social networking system 802 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 802 or by an external system of third-party system 808, which is separate from social networking system 802 and coupled to social networking system 802 via a network 804.

In particular embodiments, social networking system 802 may be capable of linking a variety of entities. As an example and not by way of limitation, social networking system 802 may enable users to interact with each other as well as receive content from third-party systems 808 or other entities, or to allow users to interact with these entities through an application programming interfaces (API) or other communication channels.

In particular embodiments, a third-party system 808 may include one or more types of servers, one or more data stores, one or more interfaces, including but not limited to APIs, one or more web services, one or more content sources, one or more networks, or any other suitable components, e.g., that servers may communicate with. A third-party system 808 may be operated by a different entity from an entity operating social networking system 802. In particular embodiments, however, social networking system 802 and third-party systems 808 may operate in conjunction with each other to provide social-networking services to users of social networking system 802 or third-party systems 808. In this sense, social networking system 802 may provide a platform, or backbone, which other systems, such as third-party systems 808, may use to provide social-networking services and functionality to users across the Internet.

In particular embodiments, a third-party system 808 may include a third-party content object provider. A third-party content object provider may include one or more sources of content objects, which may be communicated to a client device 806. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 802 also includes user-generated content objects, which may enhance a user's interactions with social networking system 802. User-generated content may include anything a user can add, upload, send, or "post" to social networking system 802. As an example and not by way of limitation, a user communicates posts to social networking system 802 from a client device 806. Posts may include data such as status updates or other textual data, location information, photos, videos, links, music or other similar data or media. Content may also be added to social networking system 802 by a third-party through a "communication channel," such as a newsfeed or stream.

In particular embodiments, social networking system 802 may include a variety of servers, sub-systems, programs, modules, logs, and data stores. In particular embodiments, social networking system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 802 may also include suitable components such as network interfaces, security mechanisms, load balancers, failover servers, management-and-network-operations consoles, other suitable components, or any suitable combination thereof. In particular embodiments, social networking system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 802 to one or more client devices 806 or one or more third-party system 808 via network 804. The web server may include a mail server or other messaging functionality for receiving and routing messages between social networking system 802 and one or more client devices 806. An API-request server may allow a third-party system 808 to access information from social networking system 802 by calling one or more APIs. An action logger may be used to receive communications from a web server about a user's actions on or off social networking system 802. In conjunction with the action log, a third-party-content-object log may be maintained of user exposures to third-party-content objects. A notification controller may provide information regarding content objects to a client device 806. Information may be pushed to a client device 806 as notifications, or information may be pulled from client device 806 responsive to a request received from client device 806. Authorization servers may be used to enforce one or more privacy settings of the users of social networking system 802. A privacy setting of a user determines how particular information associated with a user can be shared. The authorization server may allow users to opt in to or opt out of having their actions logged by social networking system 802 or shared with other systems (e.g., third-party system 808), such as, for example, by setting appropriate privacy settings. Third-party-content-object stores may be used to store content objects received from third parties, such as a third-party system 808. Location stores may be used for storing location information received from client devices 806 associated with users. Advertisement-pricing modules may combine social information, the current time, location information, or other suitable information to provide relevant advertisements, in the form of notifications, to a user.

Figure 9:
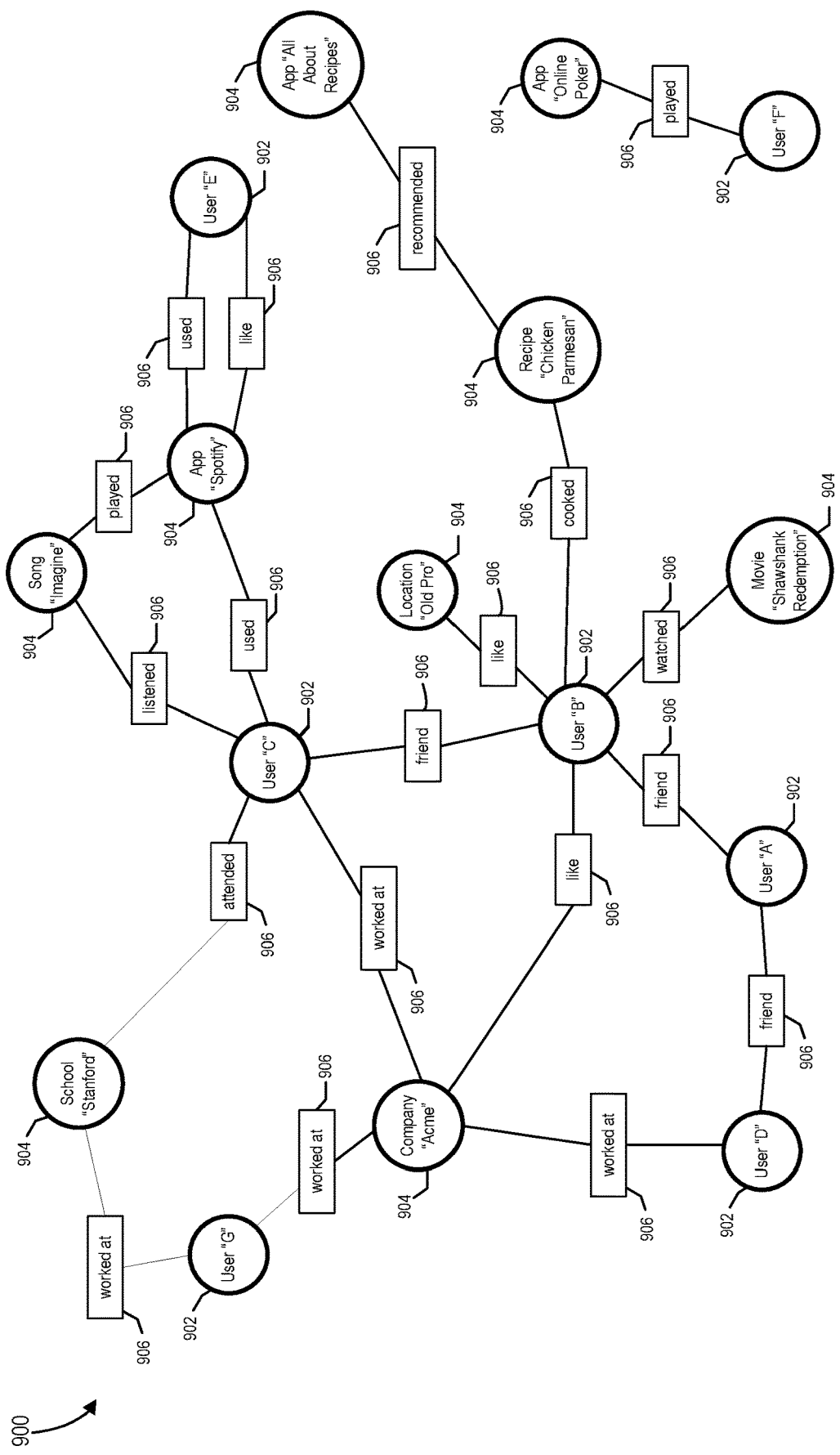
FIG. 9 illustrates a social graph in accordance with one or more embodiments.

FIG. 9 illustrates example social graph 900. Referring to FIGS. 8 and 9 together, in particular embodiments, social networking system 802 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social networking system 802, client device 806, or third-party system 808 may access social graph 900 and related social-graph information for suitable applications. The nodes and edges of social graph 900 may be stored as data objects, for example, in a data store (such as a social-graph database). Such a data store may include one or more searchable or query able indexes of nodes or edges of social graph 900.

In particular embodiments, a user node 902 may correspond to a user of social networking system 802. As an example and not by way of limitation, a user may be an individual (human user), an entity (e.g., an enterprise, business, or third-party application), or a group (e.g., of individuals or entities) that interacts or communicates with or over social networking system 802. In particular embodiments, when a user registers for an account with social networking system 802, social networking system 802 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social networking system 802. In particular embodiments, a user node 902 may be associated with information provided by a user or information gathered by various systems, including social networking system 802. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more web pages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 802 or a third-party website associated with a web-application server); an entity (such as, for example, a person, business, group, sports team, or celebrity); a resource (such as, for example, an audio file, video file, digital photo, text file, structured document, or application) which may be located within social networking system 802 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including social networking system 802. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more web pages.

In particular embodiments, a node in social graph 900 may represent or be represented by a web page (which may be referred to as a "profile page"). Profile pages may be hosted by or accessible to social networking system 802. Profile pages may also be hosted on third-party websites associated with a third-party server 808. As an example and not by way of limitation, a profile page corresponding to a particular external web page may be the particular external web page and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third party web page or resource hosted by a third-party system 808. The third party web page or resource may include, among other elements, content, a selectable or other icon, or other inter-actable object (which may be implemented, for example, in JavaScript, AJAX, or PHP codes) representing an action or activity. As an example and not by way of limitation, a third-party web page may include a selectable icon such as "like," "check in," "eat," "recommend," or another suitable action or activity. A user viewing the third-party web page may perform an action by selecting one of the icons (e.g., "eat"), causing a client device to send to social networking system 802 a message indicating the user's action. In response to the message, social networking system 802 may create an edge (e.g., an "eat" edge) between a user node 902 corresponding to the user and a concept node 904 corresponding to the third-party web page or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social networking system 802 may send a "friend request" to the second user. If the second user confirms the "friend request," social networking system 802 may create an edge 906 connecting the first user's user node 902 to the second user's user node 902 in social graph 900 and store edge 906 as social-graph information in one or more of data stores. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social networking system 802 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 802 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social networking system 802 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social networking system 802 may create an edge 906 between a user node 902 and a concept node 904 in social graph 900. As an example and not by way of limitation, a user viewing a concept-profile page (such as, for example, by using a web browser or a special-purpose application hosted by the user's client device 806) may indicate that he or she likes the concept represented by the concept node 904 by clicking or selecting a "Like" icon, which may cause the user's client device 806 to send to social networking system 802 a message indicating the user's liking of the concept associated with the concept-profile page. In response to the message, social networking system 802 may create an edge 906 between user node 902 associated with the user and concept node 904, as illustrated by "like" edge 906 between the user and concept node 904. In particular embodiments, social networking system 802 may store an edge 906 in one or more data stores. In particular embodiments, an edge 906 may be automatically formed by social networking system 802 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social networking system 802). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system web pages, third-party web pages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 802 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 802) or RSVP (e.g., through social networking system 802) to an event associated with the advertisement. In addition or as an alternative, an advertisement may include social-networking-system context directed to the user. As an example and not by way of limitation, an advertisement may display information about a friend of the user within social networking system 802 who has taken an action associated with the subject matter of the advertisement.

In particular embodiments, social networking system 802 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 802 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 802 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 802 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 802 may calculate a coefficient based on a user's actions. Social networking system 802 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 802 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Social networking system 802 may analyze a user's actions to determine whether one or more of the actions indicate an affinity for subject matter, content, other users, and so forth. As an example and not by way of limitation, if a user may make frequently posts content related to "coffee" or variants thereof, social networking system 802 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 802 may calculate a coefficient based on the type of relationship between particular objects. Referencing the social graph 900, social networking system 802 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 802 may determine that the user has a higher coefficient with respect to the first photo than the second photo because having a tagged-in-type relationship with content may be assigned a higher weight and/or rating than having a like-type relationship with content. In particular embodiments, social networking system 802 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 802 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social networking system 802 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device of the user). A first user may be more interested in other users or concepts that are closer to the first user. As an example and not by way of limitation, if a user is one mile from an airport and two miles from a gas station, social networking system 802 may determine that the user has a higher coefficient for the airport than the gas station based on the proximity of the airport to the user.

In particular embodiments, social networking system 802 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 802 may provide information that is relevant to user's interests and current circumstances, increasing the likelihood that they will find such information of interest. In particular embodiments, social networking system 802 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 802 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 802 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 808 (e.g., via an API or other communication channel), or from another suitable system. In response to the request, social networking system 802 may calculate the coefficient (or access the coefficient information if it has previously been calculated and stored). In particular embodiments, social networking system 802 may measure an affinity with respect to a particular process. Different processes (both internal and external to the online social network) may request a coefficient for a particular object or set of objects. Social networking system 802 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social networking system 802 or shared with other systems (e.g., third-party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 802 may send a request to the data store for the object. The request may identify the user associated with the request and may only be sent to the user (or a client device of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
receiving at a client device, from a social networking system, content associated with an offer from a third party for presentation to a user;
displaying, by a social networking application on the client device, the content associated with the offer in a graphical user interface comprising a feed of social networking content associated with the user;
detecting, by the client device, an interaction of the user with the content associated with the offer;
navigating, in response to the interaction of the user and within the social networking application, away from the feed of the social networking content and to a website associated with the third party within an integrated web browser of the social networking application;
displaying, within the integrated web browser of the social networking application, a graphical element associated with the offer overlaying a portion of the website associated with the third party, the graphical element comprising content related to the offer;

subsequent to navigating to the website associated with the third party, detecting an interaction of the user with the graphical element associated with the offer; and in response to the interaction of the user with the graphical element, causing the offer to be applied to a potential purchase of a product associated with the offer.

2. The method of claim 1, further comprising maintaining the display of the graphical element associated with the offer while the user navigates multiple web pages of the website associated with the third party, the graphical element overlaying a portion of each web page of the multiple web pages.

3. The method of claim 1, further comprising maintaining the display of the graphical element associated with the offer while the user navigates to a checkout web page of the website associated with the third party, the graphical element overlaying a portion of the checkout web page.

4. The method of claim 1, wherein the graphical element comprises information for redeeming the offer.

5. The method of claim 1, wherein the graphical element associated with the offer comprises a ribbon overlaying a bottom portion of the website associated with the third party.

6. The method of claim 1, wherein detecting the interaction of the user with the graphical element associated with the offer comprises detecting an interaction of the user with a selectable element within the graphical element.

7. The method of claim 1, wherein causing the offer to be applied to the potential purchase comprises copying and pasting a coupon code into a field of the website associated with the third party.

8. The method of claim 1, wherein causing the offer to be applied to the potential purchase comprises adjusting a purchase parameter of the product associated with the offer.

9. A system comprising:
at least one processor; and
at least one non-transitory computer-readable storage medium storing instructions thereon that, when executed by the at least one processor, cause the system to:
receive at a client device, from a social networking system, content associated with an offer from a third party for presentation to a user;
display, by a social networking application on the client device, the content associated with the offer in a graphical user interface comprising a feed of social networking content associated with the user;
detect, by the client device, an interaction of the user with the content associated with the offer;
navigate, in response to the interaction of the user and within the social networking application, away from the feed of the social networking content and to a website associated with the third party within an integrated web browser of the social networking application;
display, within the integrated web browser of the social networking application, a graphical element associated with the offer overlaying a portion of the website associated with the third party, the graphical element comprising content related to the offer;
subsequent to navigating to the website associated with the third party, detect an interaction of the user with the graphical element associated with the offer; and
in response to the interaction of the user with the graphical element, cause the offer to be applied to a potential purchase of a product associated with the offer.

10. The system of claim 9, wherein the instructions further cause the system to display an information window comprising information associated with the offer.

11. The system of claim 10, wherein the information window comprises a selectable element for saving the offer to a profile of the user within the social networking system.

12. The system of claim 10, wherein the information window comprises a selectable element for sharing the offer within the social networking system.

13. The system of claim 10, wherein the information window comprises a listing of active offers associated with the user or a selectable option to view the listing of active offers.

14. The system of claim 9, wherein navigating to the website associated with the third party within the integrated web browser of the social networking application comprises replacing the graphical user interface comprising the social networking content with the integrated web browser within the social networking application.

15. The system of claim 9, wherein the graphical element associated with the offer comprises a ribbon overlaying a bottom portion of the website associated with the third party.

16. A non-transitory computer readable medium storing instructions thereon that, when executed by at least one processor, cause a computer system to:
receive at a client device, from a social networking system, content associated with an offer from a third party for presentation to a user;
display, by a social networking application on the client device, the content associated with the offer in a graphical user interface comprising a feed of social networking content associated with the user;
detect, by the client device, an interaction of the user with the content associated with the offer;
navigate, in response to the interaction of the user and within the social networking application, away from the feed of the social networking content and to a website associated with the third party within an integrated web browser of the social networking application;
display, within the integrated web browser of the social networking application, a graphical element associated with the offer overlaying a portion of the website associated with the third party, the graphical element comprising content related to the offer;
subsequent to navigating to the website associated with the third party, detect an interaction of the user with the graphical element associated with the offer; and
in response to the interaction of the user with the graphical element, cause the offer to be applied to a potential purchase of a product associated with the offer.

17. The non-transitory computer readable medium of claim 16, further comprising instructions that, when executed by the at least one processor, cause the computer system to maintain the display of the graphical element associated with the offer while the user navigates multiple web pages of the website associated with the third party, the graphical element overlaying a portion of each web page of the multiple web pages.

18. The non-transitory computer readable medium of claim 16, further comprising instructions that, when executed by the at least one processor, cause the computer system to maintain the display of the graphical element associated with the offer while the user navigates to a checkout web page of the website associated with the third party, the graphical element overlaying a portion of the checkout web page.

19. The non-transitory computer readable medium of claim 16, wherein navigating to the website associated with the third party within the integrated web browser of the social networking application comprises replacing the graphical user interface comprising the social networking content with the integrated web browser within the social networking application.

20. The non-transitory computer readable medium of claim 16, wherein the graphical element comprises a coupon code associated with the offer.

* * * * *